United States Patent
Feng et al.

(10) Patent No.: US 11,361,270 B2
(45) Date of Patent: Jun. 14, 2022

(54) METHOD AND SYSTEM FOR PROVIDING INFORMATION OF STORED OBJECT

(71) Applicant: CAINIAO SMART LOGISTICS HOLDING LIMITED, Grand Cayman (KY)

(72) Inventors: Mengyuan Feng, Hangzhou (CN); Chungen Li, Hangzhou (CN); Weile Gao, Hangzhou (CN); Huaqiang Zhang, Hangzhou (CN); Xiaohua Chen, Hangzhou (CN)

(73) Assignee: Cainiao Smart Logistics Holding Limited, Grand Cayman (KY)

( * ) Notice: Subject to any disclaimer, the term of this patent is extended or adjusted under 35 U.S.C. 154(b) by 1111 days.

(21) Appl. No.: 15/720,195

(22) Filed: Sep. 29, 2017

(65) Prior Publication Data

US 2018/0101810 A1 Apr. 12, 2018

(30) Foreign Application Priority Data

Oct. 12, 2016 (CN) .......................... 201610892067.X

(51) Int. Cl.
*G06Q 10/00* (2012.01)
*G06Q 10/08* (2012.01)
(Continued)

(52) U.S. Cl.
CPC ......... *G06Q 10/08* (2013.01); *G02B 27/0172* (2013.01); *G06F 3/04815* (2013.01); *G06F 16/00* (2019.01); *G06Q 10/1097* (2013.01); *G02B 2027/014* (2013.01); *G02B 2027/0138* (2013.01); *G02B 2027/0141* (2013.01)

(58) Field of Classification Search
CPC combination set(s) only.
See application file for complete search history.

(56) References Cited

U.S. PATENT DOCUMENTS 9,443,222 B2 9/2016 Singel et al.
9,569,001 B2 2/2017 Mistry et al.
(Continued)

OTHER PUBLICATIONS

Townsend, Keith, Network overlays: When they're the right solution for your organization, Aug. 7, 2014, TechRepublic, https://www.techrepublic.com/article/network-overlays-when-theyre-the-right-solution-for-your-organization/, p. 1-10. (Year: 2014).*
(Continued)

*Primary Examiner* — Joseph M Waesco
(74) *Attorney, Agent, or Firm* — Sheppard Mullin Richter & Hampton LLP

(57) ABSTRACT

Methods and devices for providing information of a stored object are disclosed. An example method may comprise: acquiring a three-dimensional spatial model of a storage space, the three-dimensional spatial model comprising storage location information corresponding to at least one object stored inside the storage space; determining a target object stored inside the storage space, and determining a target storage location of the target stored object based on the three-dimensional spatial model; obtaining a navigation route based on location information of an augmented reality (AR) device and the target storage location; and rendering corresponding navigation information over the storage space as viewed from the AR device.

26 Claims, 16 Drawing Sheets

(51) Int. Cl.
*G06Q 10/10* (2012.01)
*G06F 3/04815* (2022.01)
*G02B 27/01* (2006.01)
*G06F 16/00* (2019.01)

(56) References Cited

U.S. PATENT DOCUMENTS

| | | | |
|---|---|---|---|
| 9,632,313 | B1 | 4/2017 | Madan et al. |
| 2004/0183751 | A1 | 9/2004 | Dempski |
| 2006/0255951 | A1 | 11/2006 | Roeder et al. |
| 2007/0035563 | A1 | 2/2007 | Biocca et al. |
| 2007/0142961 | A1 | 6/2007 | Bhasin et al. |
| 2009/0182499 | A1* | 7/2009 | Bravo .................... G01C 21/20 701/408 |
| 2009/0307265 | A1* | 12/2009 | Nicholson ............ G06Q 10/087 |
| 2010/0121480 | A1 | 5/2010 | Stelzer et al. |
| 2011/0158478 | A1 | 6/2011 | Yamada et al. |
| 2011/0246064 | A1* | 10/2011 | Nicholson .......... G06Q 30/0639 701/467 |
| 2012/0113209 | A1* | 5/2012 | Ritchey .................. G06F 3/015 348/14.02 |
| 2014/0063054 | A1* | 3/2014 | Osterhout ............... G06F 3/005 345/633 |
| 2014/0172640 | A1* | 6/2014 | Argue ................ G06Q 30/0641 705/26.61 |
| 2014/0195302 | A1* | 7/2014 | Yopp .................... G06Q 10/047 705/7.33 |
| 2014/0207615 | A1* | 7/2014 | Li ...................... G06Q 30/0623 705/26.61 |
| 2014/0279294 | A1* | 9/2014 | Field-Darragh ... G06Q 30/0282 705/28 |
| 2015/0170256 | A1* | 6/2015 | Pettyjohn ........... G06Q 30/0603 705/26.9 |
| 2015/0186728 | A1* | 7/2015 | Kimura ................ G02B 27/017 345/633 |
| 2015/0192774 | A1* | 7/2015 | Watanabe ............. G06Q 50/28 345/8 |
| 2015/0356610 | A1* | 12/2015 | Ponoth ............... G06Q 30/0261 705/14.58 |
| 2016/0063429 | A1 | 3/2016 | Varley et al. |
| 2016/0188943 | A1 | 6/2016 | Franz |
| 2016/0300179 | A1* | 10/2016 | Aviles ................. G02B 27/017 |
| 2017/0069135 | A1 | 3/2017 | Komaki et al. |
| 2017/0200296 | A1* | 7/2017 | Jones .................... G06V 20/20 |
| 2017/0343809 | A1* | 11/2017 | Benesh ................ G02B 27/017 |
| 2017/0344114 | A1* | 11/2017 | Osterhout ............ G02B 27/017 |
| 2017/0365101 | A1* | 12/2017 | Samec ............... G02B 27/0172 |
| 2018/0005446 | A1* | 1/2018 | Elazary .................. G06T 11/60 |

OTHER PUBLICATIONS

International Search Report and Written Opinion for Application No. PCT/US2017/054313, dated Dec. 15, 2017, 8 pages.
Examination Report No. 1 dated Sep. 30, 2019, issued in related Australian Patent Application No. 2017343482 (4 pages).

* cited by examiner

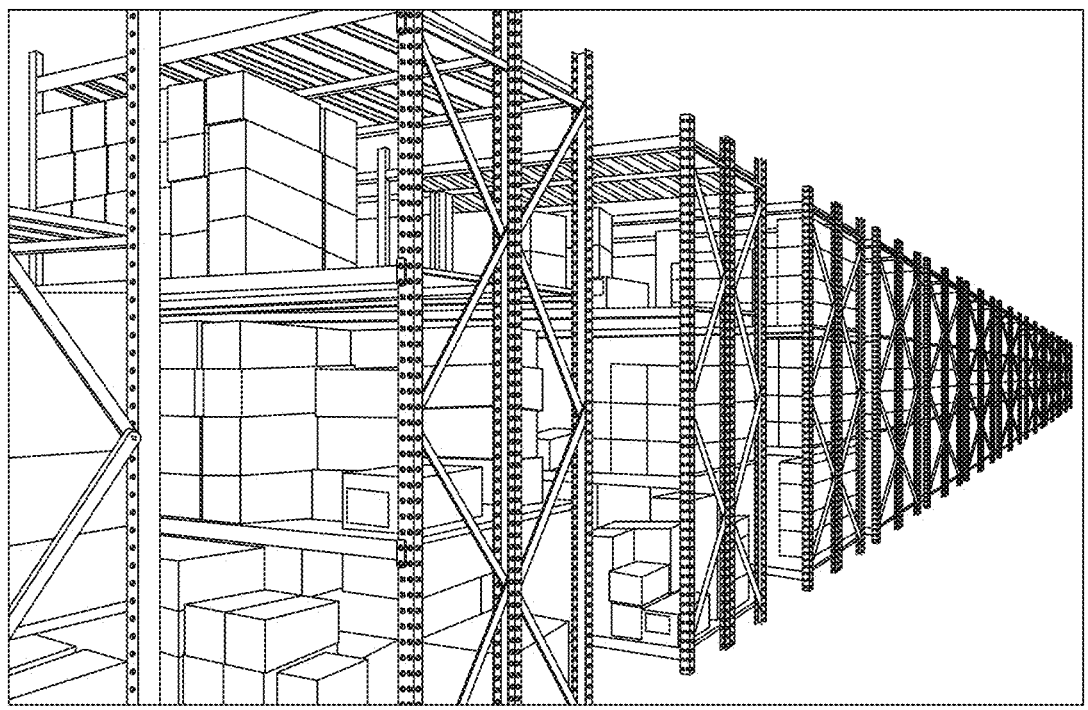
FIGURE 4 (top)
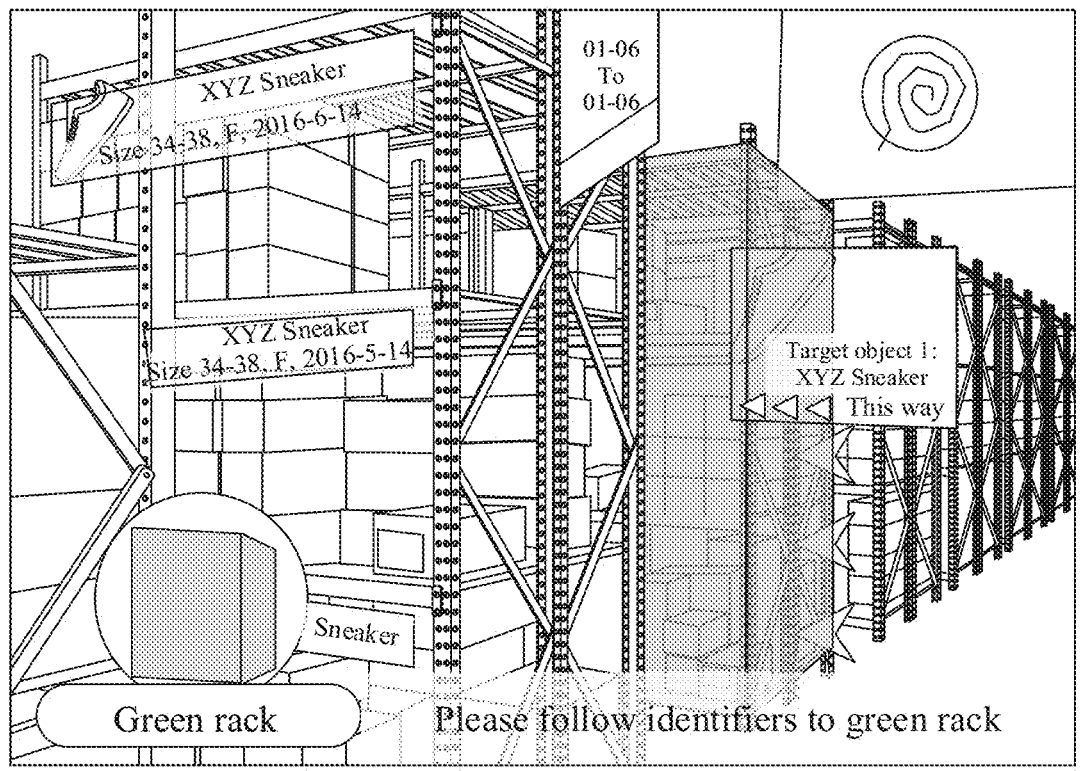
FIGURE 4 (bottom)

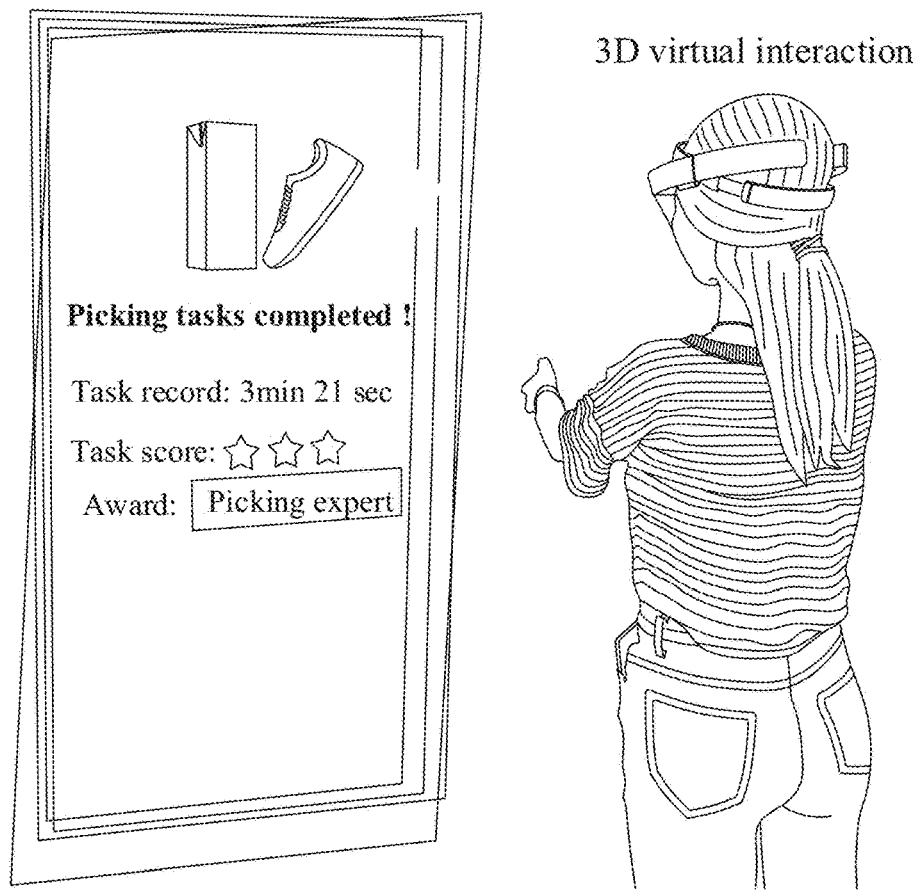

FIGURE 10

S1101: Generating a three-dimensional spatial model of a storage space, the three-dimensional spatial model comprising storage location information corresponding to at least one object stored inside the storage space

S204: Providing the three-dimensional spatial model to a client terminal, causing the client terminal to determine a target object stored inside the storage space, determine a target storage location of the target stored object based on the three-dimensional spatial model, determine a target storage location of the target stored object based on the three-dimensional spatial model, obtain a navigation route based on location information of an augmented reality (AR) device and the target storage location, and render corresponding navigation information over the storage space as viewed from the AR device

FIGURE 11

METHOD AND SYSTEM FOR PROVIDING INFORMATION OF STORED OBJECT

CROSS REFERENCE TO RELATED APPLICATIONS

The present application is based on and claims priority to the Chinese Application No. 201610892067.X, filed Oct. 12, 2016, the entire contents of which are incorporated herein by reference.

TECHNICAL FIELD

The present disclosure relates to the technical field of object information processing, and in particular, it relates to a method and device for providing information of stored objects.

BACKGROUND

In swiftly developing technologies such as e-commerce, logistics services are an extremely critical link. From warehousing to order item picking and dispatch for distribution, the quality of service at each step affects the user experience. For large-scale comprehensive warehouses, the quantity and types of goods stored are numerous. Even though partitioning can be conducted in advance for different categories of products by storage locations, during the order item picking and dispatch steps and when presented with large-batch order item picking tasks, operation efficiency is low.

In existing technologies, a system distributes order item picking tasks to order item pickers, who perform order item picking inside the warehouse. However, because there are a vast number of storage locations and racks in the warehouse, order item pickers usually need to study in advance the geographic location information of the storage locations and racks inside the warehouse and the placement of goods, etc., in order to increase order item picking efficiency. Clearly, this method requires substantial effort to study, and the order item picking efficiency and accuracy cannot be improved to the maximum extent.

Therefore, it has been challenging for those skilled in the art to solve the technical problem of improving warehouse order item picking efficiency and accuracy.

SUMMARY

The present disclosure provides methods and devices for providing information of stored object, which can improve the implementation efficiency and accuracy of operations such as order item picking.

According to one aspect, a method for providing information of a stored object may comprise: acquiring a three-dimensional spatial model of a storage space, the three-dimensional spatial model comprising storage location information corresponding to at least one object stored inside the storage space; determining a target object stored inside the storage space, and determining a target storage location of the target stored object based on the three-dimensional spatial model; obtaining a navigation route based on location information of an augmented reality (AR) device and the target storage location; and rendering corresponding navigation information over the storage space as viewed from the AR device. In some embodiments, the method may be implemented by a client terminal (e.g., the AR device, a mobile terminal device such as a mobile phone coupled to the AR device).

According to another aspect, a method for providing information of stored object may be implementable on a server. The method may comprise: generating a three-dimensional spatial model of a storage space, the three-dimensional spatial model comprising storage location information corresponding to at least one object stored inside the storage space; and providing the three-dimensional spatial model to a client terminal, causing the client terminal to determine a target object stored inside the storage space, determine a target storage location of the target stored object based on the three-dimensional spatial model, determine a target storage location of the target stored object based on the three-dimensional spatial model, obtain a navigation route based on location information of an augmented reality (AR) device and the target storage location, and render corresponding navigation information over the storage space as viewed from the AR device.

According to another aspect, a non-transitory computer-readable storage medium may store instructions that, when executed by a system, cause the system to perform a method for providing information of stored object. The method may comprise: acquiring a three-dimensional spatial model of a storage space, the three-dimensional spatial model comprising storage location information corresponding to at least one object stored inside the storage space; determining a target object stored inside the storage space, and determining a target storage location of the target stored object based on the three-dimensional spatial model; obtaining a navigation route based on location information of an augmented reality (AR) device and the target storage location; and rendering corresponding navigation information over the storage space as viewed from the AR device. In some embodiments, the system may comprise a client terminal (e.g., the AR device, a mobile terminal device such as a mobile phone coupled to the AR device).

According to another aspect, a non-transitory computer-readable storage medium may store instructions that, when executed by a server, cause the server to perform a method for providing information of stored object. The method may comprise: generating a three-dimensional spatial model of a storage space, the three-dimensional spatial model comprising storage location information corresponding to at least one object stored inside the storage space; and providing the three-dimensional spatial model to a client terminal, causing the client terminal to determine a target object stored inside the storage space, determine a target storage location of the target stored object based on the three-dimensional spatial model, determine a target storage location of the target stored object based on the three-dimensional spatial model, obtain a navigation route based on location information of an augmented reality (AR) device and the target storage location, and render corresponding navigation information over the storage space as viewed from the AR device.

According to another aspect, a method for providing information of stored object is disclosed, wherein the method comprises: the client terminal acquires a three-dimensional spatial model of the inside of the target storage space, and storage location information corresponding to at least one stored object inside the storage space is saved in the three-dimensional spatial model; the target stored object is determined, and the target storage location of the target stored object is determined based on the three-dimensional spatial model; a navigation route is calculated based on the location information of an augmented reality (AR) device and the target storage location; corresponding visual navigation information is rendered over the storage space within the field of view of the AR device when the AR device is carried around.

According to another aspect, a method for providing information of stored object is disclosed, the method comprising: a server generates a three-dimensional spatial model of the inside of the target storage space, and storage location information corresponding to at least one stored object inside the storage space is saved in the three-dimensional spatial model; the three-dimensional spatial model's information is provided to the client terminal, for the client terminal to determine the target storage location of the target stored object based on the three-dimensional spatial model, after determining the target stored object; a navigation route is calculated based on the location information of an augmented reality (AR) device and the target storage location, and corresponding visual navigation information is rendered over the storage space within the field of view of the AR device when the AR device is carried around.

According to another aspect, a method for the collection processing of goods stored in a warehouse is disclosed, wherein the method comprises: a client terminal acquires a three-dimensional spatial model of the inside of a target warehouse, and information of the storage location inside the target warehouse corresponding to at least one piece of merchandise is saved in the three-dimensional spatial model; a collection task request is transmitted to a server; target merchandise is determined based on the collection task distributed by the server, and the target storage location of the target merchandise is determined based on the three-dimensional spatial model; a navigation route is calculated based on the location information of an augmented reality (AR) device and the target storage location; corresponding visual navigation information is provided in the warehouse within the field of view of the AR device when the AR device is carried around, for collection processing of the target merchandise in accordance with the navigation information.

According to another aspect, a method for the collection processing of goods stored in a warehouse is disclosed, the method comprising: a server generates a three-dimensional spatial model of the inside of a target warehouse, and information of the storage location inside the target warehouse corresponding to at least one piece of merchandise is saved in the three-dimensional spatial model; the three-dimensional spatial model's information is provided to the client terminal; after receiving a collection task request submitted by the client terminal, a collection task is generated and distributed to the client terminal, for the client terminal to determine the target merchandise based on the collection task distributed by the server, and the target storage location of the target merchandise is determined based on the three-dimensional spatial model; a navigation route is calculated based on the location information of an augmented reality (AR) device and the target storage location, and corresponding visual navigation information is provided in the warehouse within the field of view of the AR device when the AR device is carried around, for collection processing of the target merchandise in accordance with the navigation information.

According to another aspect, a device providing information of stored object, implementable on a client terminal, is disclosed. The device may comprise: a first model acquisition unit, configured to acquire a three-dimensional spatial model of the inside of the target storage space, wherein storage location information corresponding to at least one stored object inside the storage space is saved in the three-dimensional spatial model; a first information determination unit, configured to determine the target stored object, wherein the target storage location of the target stored object is determined based on the three-dimensional spatial model; a first navigation route calculation unit, configured to calculate a navigation route based on the location information of an augmented reality (AR) device and the target storage location; a first navigation information supply unit, configured to provide corresponding visual navigation information of the storage space within the field of view of the AR device when the AR device is carried around.

According to another aspect, an augmented reality (AR) device is disclosed. The AR device includes a device providing information of stored object.

According to another aspect, a mobile terminal device is disclosed. The mobile terminal device comprises a device for providing information of stored object, and the mobile terminal device is configured to connect to an augmented reality AR device.

According to another aspect, a device providing information of stored object, implementable on a server, is disclosed. The device comprises: a first model generation unit, configured to generate a three-dimensional spatial model of the inside of the target storage space, wherein storage location information corresponding to at least one stored object inside the storage space is saved in the three-dimensional spatial model; a first model provision unit, configured to provide the client terminal with the three-dimensional spatial model's information, for the client terminal to determine the target storage location of the target stored object based on the three-dimensional spatial model after determining the target stored object; a first navigation route calculation unit, configured to calculate a navigation route based on the location information of the AR device and the target storage location; and a first navigation information supply unit configured to render corresponding visual navigation information over the storage space within the field of view of the AR device when the AR device is carried around.

According to another aspect, a device for the collection processing of goods stored in a warehouse, implementable on a client terminal, is disclosed. The device comprises: a second model acquisition unit, configured to acquire a three-dimensional spatial model of the inside of a target warehouse, wherein information of the storage location inside the target warehouse corresponding to at least one piece of merchandise is saved in the three-dimensional spatial model; a task request unit, configured to transmit collection task requests to a server; a second information determination unit, configured to determine target merchandise based on the collection task distributed by the server, wherein the target storage location of the target merchandise is determined based on the three-dimensional spatial model; a second navigation route calculation unit, configured to calculate a navigation route based on the location information of the AR device and the target storage location; a second navigation information supply unit, configured to provide corresponding visual navigation information in the warehouse within the field of view of the AR device when the AR device is carried around, for collection processing of the target merchandise in accordance with the navigation information.

According to another aspect, an augmented reality (AR) device is disclosed, wherein the AR device includes a device for the collection processing of goods stored in a warehouse.

According to another aspect, a mobile terminal device is disclosed; the mobile terminal device comprises a device for the collection processing of goods stored in a warehouse, and the mobile terminal device is configured to connect to an augmented reality (AR) device.

According to another aspect, a device for the collection processing of goods stored in a warehouse, implementable on a server, is disclosed. The device comprises: a second model generation unit, configured to generate a three-dimensional spatial model of the inside of a target warehouse, wherein information of the storage location inside the target warehouse corresponding to at least one piece of merchandise is saved in the three-dimensional spatial model; a second model provision unit, configured to provide the client terminal with the three-dimensional spatial model's information; and a collection task generation unit, configured to generate a collection task and distribute it to the client terminal after receiving a collection task request submitted by the client terminal, causing the client terminal to: determine the target merchandise based on the collection task distributed by the server, determine the target storage location of the target merchandise based on the three-dimensional spatial model, calculate a navigation route based on the location information of the AR device and the target storage location, and provide corresponding visual navigation information in the warehouse within the field of view of the AR device when the AR device is carried around, for collection processing of the target merchandise in accordance with the navigation information.

According to another aspect, a method for collecting goods stored in a warehouse, implementable by a client terminal, may comprise: acquiring a three-dimensional spatial model of a target warehouse, the three-dimensional spatial model comprising storage location information corresponding to at least one merchandise stored in the target warehouse; transmitting a collection task request to a server; determining a target merchandise based on a collection task distributed by the server in response to the collection task request, and determining a target storage location of the target merchandise based on the three-dimensional spatial model; obtaining navigation information based on location information of an augmented reality (AR) device and the target storage location; and rendering the navigation information through the AR device, for collecting the target merchandise in accordance with the navigation information.

According to another aspect, an apparatus for collecting goods stored in a warehouse, implementable on a client terminal, may comprise a model acquisition unit configured to acquire a three-dimensional spatial model of a target warehouse, the three-dimensional spatial model comprising storage location information corresponding to at least one merchandise stored in the target warehouse, a task request unit configured to transmit a collection task request to a server, an information determination unit configured to determine a target merchandise based on a collection task distributed by the server in response to the collection task request, and determine a target storage location of the target merchandise based on the three-dimensional spatial model, a navigation route calculation unit configured to obtain navigation information based on location information of an augmented reality (AR) device and the target storage location, and a navigation information supply unit configured to render the navigation information through the AR device, for collecting the target merchandise in accordance with the navigation information.

Based on the embodiments provided by the present disclosure, the present disclosure discloses the following technical effects: consistent with the embodiments of the present disclosure, the client terminal can acquire a three-dimensional spatial model of the inside of the target storage space in advance, wherein information of the storage location of the stored object in the storage space is saved. Thus, after determining the target stored object to be processed, it is possible to determine the target storage location of the target stored object based on the three-dimensional spatial model and calculate a navigation route based on the location information of the AR device and the target storage location. When the AR device is carried around, corresponding visual navigation information is rendered over the storage space within the field of view of the AR device. That is, after the user enters the storage space, they can use the AR device to view "augmented" information. This type of information is information that is navigational in nature. Thus, the target stored object can be found by traveling directly according to navigation information, and the collection task can be completed. Therefore, the user does not need to be familiar with the storage space layout in advance, and does not need to remember information such as the storage location of stored objects. Therefore, it can lower the user's study costs. Also, through navigation information, it is possible to improve the implementation efficiency and accuracy of operations such as order item picking.

Any product implementing the present disclosure does not necessarily need to simultaneously achieve all of the above advantages.

BRIEF DESCRIPTION OF THE DRAWINGS

The attached drawings of the description below are merely a few embodiments of the present disclosure. Those possessing ordinary skill in the art could obtain other drawings based upon these attached drawings without creative efforts.

FIGS. 4-8 are diagrams of the interface within the field of view consistent with the embodiments of the present disclosure;

FIGS. 9-1, 9-2, and 9-3 are diagrams of the collection result mode consistent with the embodiments of the present disclosure;

FIG. 10 is a diagram of the task completion interface consistent with the embodiments of the present disclosure;

FIG. 11 is a flowchart of the second method consistent with the embodiments of the present disclosure;

DETAILED DESCRIPTION

Figure 1:
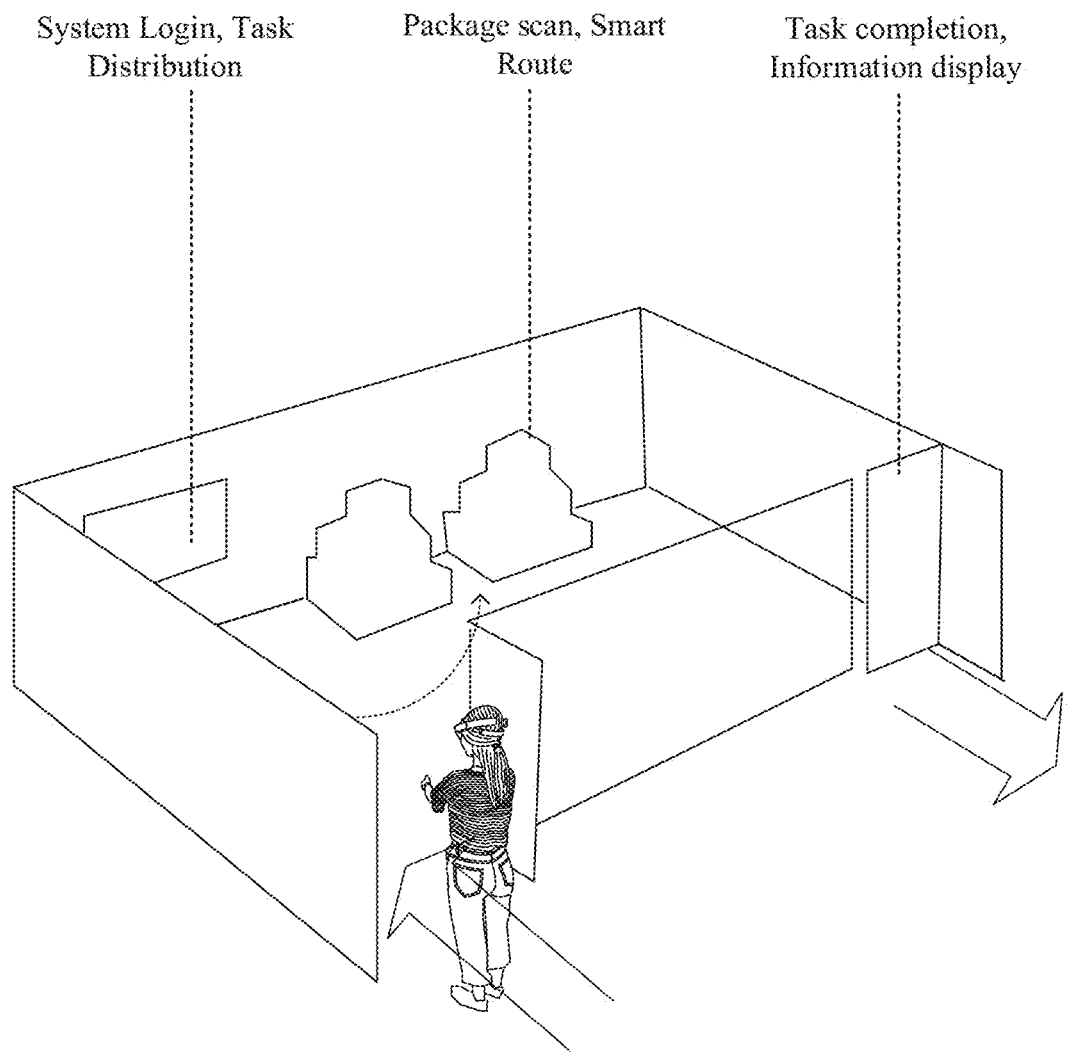
FIG. 1 is a schematic diagram of an application scenario consistent with the embodiments of the present disclosure.

The embodiments described here are merely exemplary. All other embodiments acquired by those possessing ordinary skill in the art based on the embodiments of the present disclosure fall within the scope of protection of the present disclosure.

In some embodiments of the present disclosure, it is possible to carry out navigation inside a storage space through augmented reality (AR). For example, referring to FIG. 1, a worker such as an order item picker can enter a storage space (e.g., a warehouse) wearing an AR device such as AR glasses or an alternative device (e.g., a mobile phone coupled to an AR device). A system (e.g., a server) conducts task allocation for the worker, based on which programs in the AR device provide cue information such as scanning and navigation to help the order item picker navigate in the warehouse and complete the order item picking. Thus, the order item pickers will not have to study the warehouse storage locations and rack information in advance, saving their study costs and increasing the order item picking efficiency.

Here, the AR technology refers to, performing digital imaging of the real physical environment to perceive and understand the three-dimensional world through image data and sensor data, and gaining an understanding of three-dimensional interactions. The goal of understanding three-dimensional interaction is to determine a content to be "augmented" and the augmentation location and position. Once the content to be augmented and the position and location are determined, a rendering system can combine virtual and real images to present to the user visually, thus achieving augmented reality effects. Further, a person of ordinary skill in the art would appreciate many other alternative names for the AR device such as VR (virtual reality) devices, which can be used with or in place of the AR device described herein.

To facilitate the understanding of three-dimensional interaction, a three-dimensional spatial model can be established in advance. In some embodiments of the present disclosure, the three-dimensional space can refer to a storage space (for example, a "warehouse" used to store goods, a "mailbox" used to store used to store express packages, etc.) used to store various types of stored objects (for example, goods, express packages, etc.). Therefore, it is possible to establish a three-dimensional spatial model for this type of storage space in advance, and then AR-based indoor navigation can be conducted based on this three-dimensional spatial model.

There can be various modes of implementation to establish a three-dimensional spatial model. For example, in one such mode, a worker wearing an AR device such as AR glasses can enter a real storage space and walk around inside the space. The AR device may comprise a sensing device such as a camera configured to scan the storage space (e.g., the internal layout, the environment and objects inside the storage space). The obtained scanning results can be fed into a development environment. This development environment can support labeling of scanning results, such as manual labelling. For example, the storage space includes a plurality of racks, each rack comprises a plurality of unit storage zones (for example, the "lattice space" on the rack, or "merchandise compartment"), and each unit storage zone can be used to store objects of the same SKU (Stock Keeping Unit) (for example, "goods", etc.). The rack number, unit storage zone number, and other information corresponding to the stored object can be labeled. After the labeling is completed, the system can save information such as the rack number, unit storage zone number, and other corresponding stored object's information. At the same time, the system can generate and save information such as the coordinates of the location of the racks and unit storage zones, based on which a corresponding three-dimensional spatial model of the storage space can be generated. There can be other ways of establishing three-dimensional spatial models, which will not be individually described here.

To achieve navigation, a client terminal software (e.g., a software including applications or related functional modules) can be implemented in advance on the client terminal (e.g., an AR device, a mobile terminal device couple to an AR device). A client terminal can be cooperatively used with the AR device in various forms. For example, the client terminal software can be directly installed in integrated AR device (e.g., AR device independently undertaking tasks such as screen display, calculation, and storage), allowing the AR device to provide navigation within the storage space. For another example, a mobile terminal device such as a mobile phone can be connected to a mobile AR device and the client terminal software can be installed in the mobile terminal device. The AR device can provide the navigation function within the storage space. In addition, after a three-dimensional spatial model is generated, it can be directly saved to the terminal device in which the client terminal is stored (e.g., the AR device or the mobile terminal device), or it can be stored in a server. When the client terminal needs to conduct navigation, the three-dimensional spatial model corresponding to the current storage space can be downloaded from the server. In summary, regardless of whether the client terminal software is directly installed in an AR device or in a mobile terminal device, the AR device can achieve indoor navigation based on the client terminal and the generated three-dimensional spatial model described above. A detailed explanation of the embodiments is provided below.

As described, the client terminal and the server may couple to and communicate with each other to provide information of stored items, navigation information, etc. In some embodiments, the client terminal may comprise a processor and a non-transitory computer-readable storage medium (memory) storing instructions that, when executed by the processor, cause the client terminal to perform various methods described herein with respect to the client terminal. The client terminal software may be implemented as at least a part of the instructions. A user may wear the client terminal or a component thereof, from which various renderings as provided by the client terminal and described herein may be viewed by the user. The renderings can augment generated virtual information (e.g., stored object information, navigation direction) with the physical environment (whether real or virtual) as viewed from the client terminal to help the user efficiently locate an item for retrieval from a storage space, confirm its identity, and process records. Further, the server may comprise a processor and a non-transitory computer-readable storage medium (memory) storing instructions that, when executed by the processor, cause the client terminal to perform various methods described herein with respect to the server.

Figure 2:
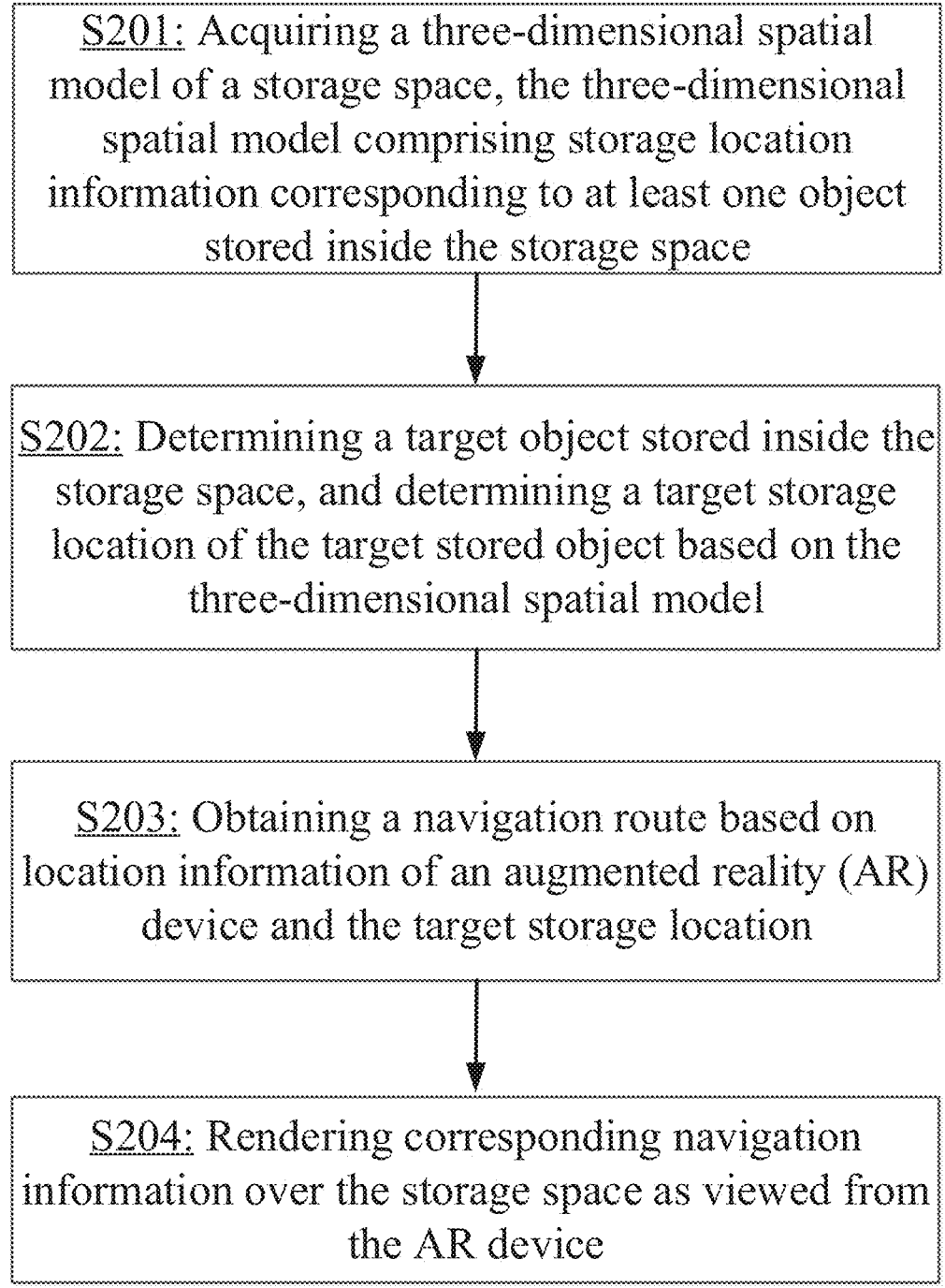
FIG. 2 is a flowchart of the first method consistent with the embodiments of the present disclosure.

Referring to FIG. 2, a method for providing information of stored object is provided, and the method may be implementable by a client terminal described above. For example, this method can comprise the following steps.

S201 includes acquiring a three-dimensional spatial model of a storage space, the three-dimensional spatial model comprising storage location information corresponding to at least one object stored inside the storage space. For example, the client terminal acquires a three-dimensional spatial model of the inside of the target storage space, and storage location information corresponding to at least one stored object inside the storage space is saved in the three-dimensional spatial model.

As described above, after the three-dimensional spatial model is generated, it can be saved to the terminal device where the client terminal is stored. This terminal device can be an integrated AR device or a mobile terminal device such as a cell phone, and this mobile terminal device is connected to a mobile AR device. Alternatively, the three-dimensional spatial model can be directly saved to a server. In this case, the server can store the three-dimensional spatial models corresponding to multiple storage spaces. When the client terminal enters a target storage space, it requests acquisition of the three-dimensional spatial model corresponding to this target storage space from the server.

S202 includes determining a target object stored inside the storage space, and determining a target storage location of the target stored object based on the three-dimensional spatial model. For example, a target stored object is determined, and the target storage location of the target stored object is determined based on the three-dimensional spatial model.

When a worker such as an order item picker needs to go to a storage space such as a warehouse to carry out a task such as order item picking, the worker can wear a related AR device (including an integrated AR device or a mobile AR device connected to a mobile terminal device) and enter a real storage space. Afterward, the associated client terminal can be started. After the client terminal has been started, initialization processing can be conducted, which can comprise conducting spatial matching between the three-dimensional spatial model and the storage space. The spatial matching may refer to that a three-dimensional spatial model can be matched to the actual storage space, causing the location in the three-dimensional space to correspond to the respective location in the actual storage space. There can be multiple methods of conducting spatial matching. For example, in one mode, some feature points can be saved in the three-dimensional spatial model in advance, such as the location of four wall corners within the space, etc. After an order item picker wearing an AR device such as AR glasses enters a storage space, they start the application, then, wearing the AR glasses, they can take a look around the storage space. The sensor device of the AR glasses can conduct scanning of the storage space, then, using feature points and scanning results, matching can be conducted between the feature points and the actual location points in the storage space, to determine the locations and orientations in the three-dimensional spatial model, thus completing spatial matching. Finally, the location of every point in the three-dimensional spatial model is matched to the actual location in the storage space. During implementation, other modes can be used to achieve spatial matching. For example, automatic calibration, etc., can be implemented, which will not be individually detailed here.

After completing initialization, the client terminal can determine the target stored object; that is, it can determine which stored object(s) currently require processing operations such as collection. In some embodiments, there can be multiple types of determination modes. For example, if the storage space is a warehouse, the stored objects are goods, and the target stored object is a merchandise to be extracted from the warehouse in the current collection task, after the order item picker enters the storage space, the client terminal can give related information notifications such as "initialization complete" to the server and transmitting a collection task request. Thus, the server can select a related data object from a "task pool," generate a collection task, and allocate it to the client terminal associated with the current order item picker. The stored object corresponding to the data object in the collection task serves as the current target stored object to be processed.

Here, the server can refer to a sales platform server, express delivery system server, etc. For example, as a sales platform server, the server can generate an "order item picking task pool" through accepting consumer orders, and tasks in the task pool can be associated with storage spaces. Thus, after an order item picker enters a storage space, a collection task is allocated to the current order item picker from this task pool. For example, when a consumer places an order for a data object (e.g., a product object) through a sales platform, the server can perform routing based on the consumer's delivery address, determine the shipping warehouse, and add a collection task for this shipping warehouse. Thus, with order placement actions of multiple consumers, it is possible to generate individual task pools for each shipping warehouse, i.e., each shipping warehouse can be associated with multiple collection tasks. After an order item picker enters a shipping warehouse, the server can allocate a collection task to the order item picker based on the associated task pool of the shipping warehouse. Then, based on the collection task allocated by the server, the client terminal can determine the current target stored object to be obtained from the storage space. That is, the client terminal may transmit a collection task request to a server, and receive a collection task allocated by the server, and determine the target stored object based on the target stored object's information included in the collection task.

After determining the target stored object, it is possible to determine the location of the target stored object based on information saved in the three-dimensional spatial model. Because spatial matching has been conducted, this location information can correspond to the location of the stored object in the actual storage space.

There can be multiple stored objects in a collection task. The location information for each stored object can be determined based on information saved in the three-dimensional spatial model, to conduct navigation route planning based on each location.

S203 includes obtaining a navigation route based on location information of an augmented reality (AR) device and the target storage location. For example, a navigation route is calculated based on the location information of the AR device and the target storage location.

After determining the target storage location information for the target stored object, a navigation route can be calculated based on the location of the AR device and the target storage location. Here, information on the location of the AR device can be acquired through computer vision. For example, the AR device can be positioned based on information collected by a sensor device such as a camera on the AR device. AR devices are usually worn by a user such as an order item picker. Therefore, this is equivalent to positioning the user. Here, when the AR device location information and the target storage location are known, existing technologies can be used to conduct navigation route planning, which will not be detailed here. However, because one collection task can include multiple target stored objects, a related algorithm can be provided in advance. Obtaining the navigation route based on the location information of the AR device and the target storage location may comprise determining a processing sequence for the target stored objects based on the location information of the AR device and the target storage location of each of the target stored objects, and obtaining a navigation route among the target stored objects according to the processing sequence. When conducting navigation route planning, a processing sequence for the target stored objects can first be determined through this algorithm, based on the location information of the AR device and the target storage location of each target stored object (for example, the shortest overall route can be used as a principle, etc.). Next, a navigation route from the current location to the first target stored object and navigation routes between all subsequent target stored objects are provided according to the processing sequence. That is, assuming that the current order item picking task includes target stored objects A, B, and C, based on the current location and the storage locations of target stored objects A, B, and C, it is possible to calculate which stored object to collect first and which stored object to collect next in order to complete the collection task in the shortest period of time, etc.

S204 includes rendering corresponding navigation information over the storage space as viewed from the AR device. For example, corresponding visual navigation information is rendered over the storage space within the field of view of the AR device (e.g., when the AR device is carried around).

After conducting route planning, visual navigation information can be provided through the AR device when the AR device is carried around. This navigation information can be dynamically changing; that is, real-time updates can be made to the navigation information based on the actual location of the AR device in the travel process. The vision provided through the AR device within the field of view usually comprises two parts: one part is a view of the actual space, and the other part is an "augmented" virtual view. In some embodiments of the present disclosure, this visual navigation information belongs to the "augmented" virtual view. That is, an order item picker can use AR glasses to see an actual view of the storage space within the field of view, and at the same time can see "augmented" information, which can be primarily navigation information. Thus, as long as the order item picker travels according to this navigation information, they will be able to arrive at the location of the target stored object to be collected and complete the collection task. Therefore, it is not necessary to remember information such as the layout of the storage space and goods storage locations. It can lower order item pickers' study costs and can boost the efficiency and accuracy of order item picking.

Figure 3:
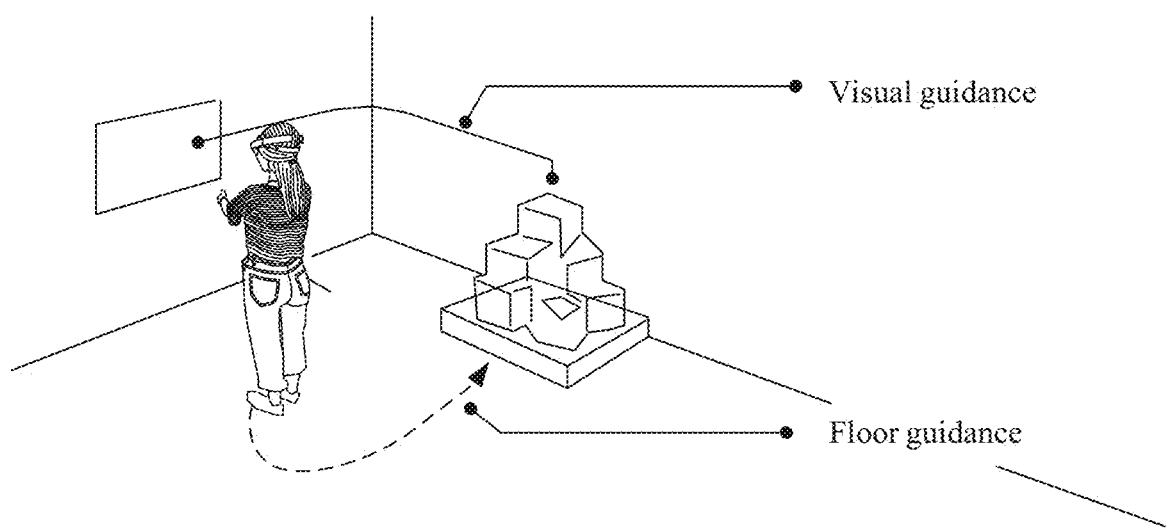
FIG. 3 is a diagram of the guidance mode consistent with the embodiments of the present disclosure.

Here, there can be a variety of forms of visual navigation information provided through the AR device. For example, in one mode, the navigation information can include "floor guidance" as shown in FIG. 3. Rendering the corresponding navigation information over the storage space as viewed from the AR device may comprise rendering travel direction information on the floor of the storage space as viewed from the AR device. That is, visual travel direction information can be provided through the AR device on the floor of the storage space within the field of view. For example, because spatial matching has been conducted in advance, the "floor" in the space can be recognized during the travel process through computer vision, and travel direction information such as "arrows" can be displayed on the "floor." In addition, to further strengthen effects, "visual guidance" can be provided. Rendering the corresponding navigation information over the storage space as viewed from the AR device may comprise when the target storage location appears in the AR device's field of view, rendering information of the target storage location over the storage space as viewed from the AR device. That is, when the target storage location appears within the field of view, information for the target storage location can be provided in the storage space within the field of view, e.g., an order item picker can look through AR glasses and see "augmented" information of the target storage location in the storage space. Here, recognition of whether the target storage location is present within the field of view can be conducted through computer vision, which will not be detailed here.

In some embodiments, the storage space includes a plurality of racks, and the storage location information of the at least one stored object in the storage space saved in the three-dimensional spatial model includes location information of a target rack storing the target stored object, determining the target storage location of the target stored object based on the three-dimensional spatial model comprises determining a location of the target rack storing the target stored object based on the three-dimensional spatial model, and rendering the information of the target storage location over the storage space as viewed from the AR device comprises rendering information of the location of the target rack when the target rack appears in the field of view of the AR device. For example, as shown in FIG. 4, the top image shows the example actual storage space as viewed by the naked eye, and the bottom image shows the example storage space as viewed through AR glasses. From the figure, information of the location of the target rack storing the target stored object is provided, as shown by the direction of the "arrow" in the figure. Also, the location of the target rack storing the target stored object can be highlighted. For example, the location can be displayed in green, etc. That is, an order item picker can look through AR glasses and see the color of one rack different from the other racks, and an "arrow" indicating "go inside," etc. Thus, an order item picker can very easily distinguish the target rack based on this type of color information, making it easy for them to retrieve the corresponding target stored object.

Figure 5:
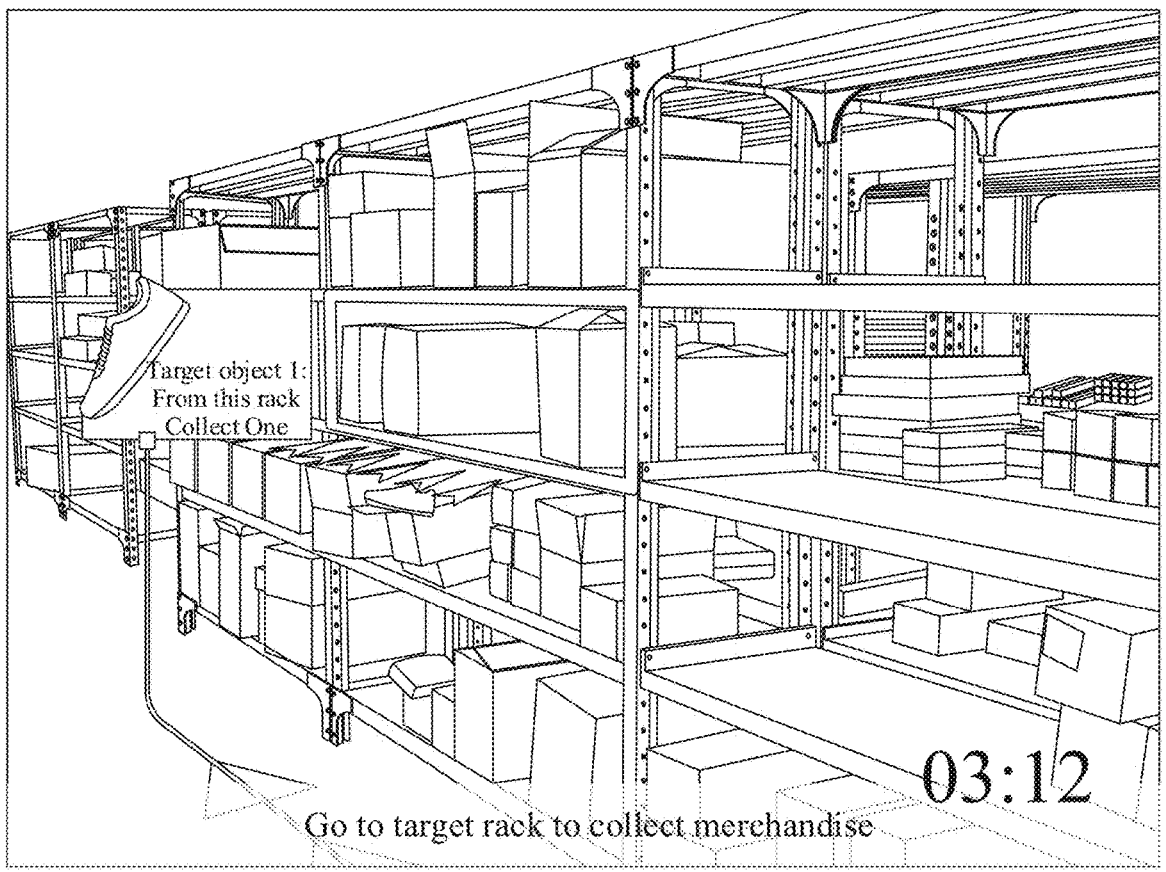

In some embodiments, every rack in the storage space comprises a plurality of unit storage zones, each of the unit storage zones is configured to store stored objects of a same stock keeping unit (SKU), the storage location information further comprises unit storage zone location information for the at least one stored object on the rack, determining the target storage location of the target stored object based on the three-dimensional spatial model further comprises determining a location of a target unit storage zone of the target stored object on the rack based on the three-dimensional spatial model, and rendering the information of the target storage location over the storage space as viewed from the AR device further comprises rendering information of the location of the target unit storage zone when the target unit storage zone appears in the field of view of the AR device. For example, as shown in FIG. 5, the target unit storage zone enters the field of view after arriving at the location of the target rack based on the rack information shown in FIG. 4. At this time, information of the location of the target unit storage zone can be provided, such as displaying this zone in green, etc. Thus, an order item picker can directly go to this unit storage zone and retrieve the corresponding target stored object without having to search among the vast number of unit storage zones. Thus, the efficiency can be enhanced.

Figure 6:
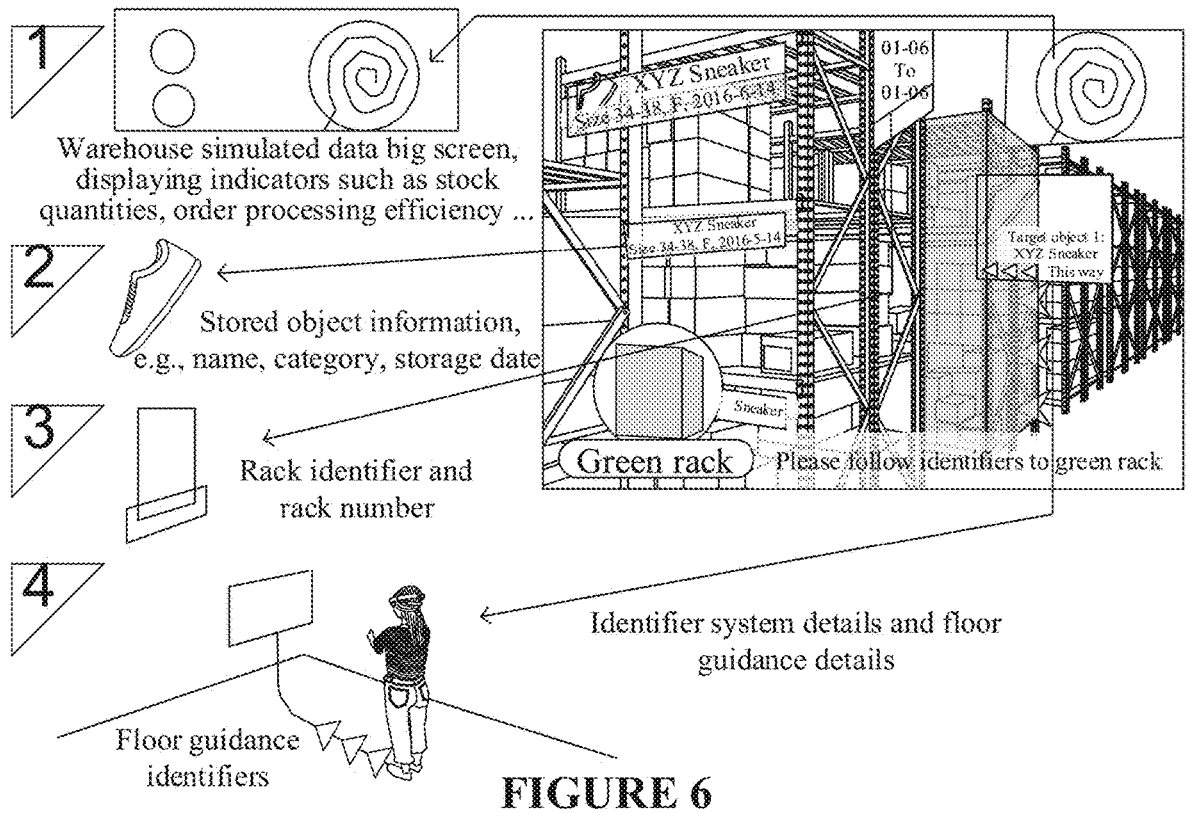

Also, in addition to navigation information, information regarding other aspects can also be provided. For example, visual rack identifier information of each rack in the field of view can be rendered or otherwise provided (e.g., as viewed from the AR device), such as "rack 01-01 to 01-06" shown in FIG. 6. Further, information of the target object (for example, the name, category, and storage date of the merchandise, etc.) stored on the rack can be rendered or otherwise provided (e.g., as viewed from the AR device). The "XYZ-Brand sneakers 34-38 Women's Storage date: 2016-5-14" information shown in FIG. 6 is not present in the storage space as viewed by the naked eye. In addition, a "data big screen" can be simulated, using the AR device to render or otherwise provide information such as stock quantity over the storage space as viewed from the AR device.

Figure 7:
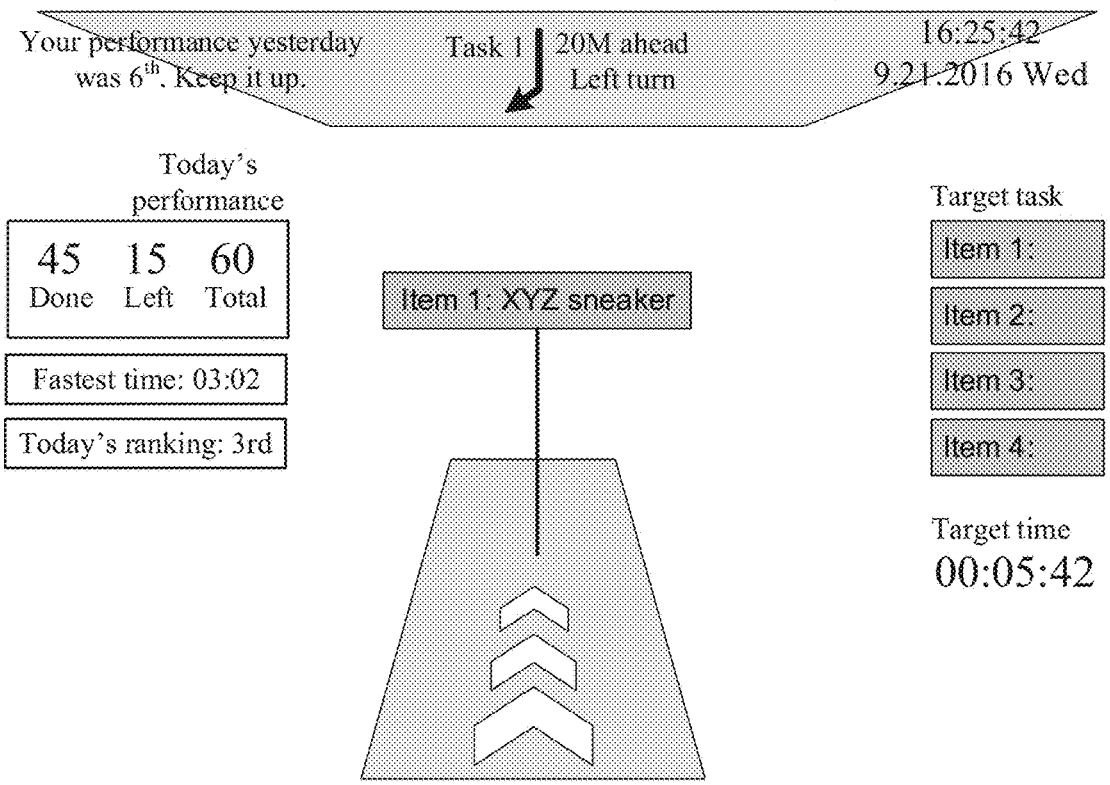

In some embodiments, in addition to the abovementioned information such as navigation information and simulated "data big screens," supplementary information can be rendered over the storage space as viewed from the AR device. Here, the supplementary information comprises task list information and task processing progress and/or task processing time information, etc., and it can also comprise "competitive" data such as task processing efficiency rankings, etc. In some embodiments, rendering the supplementary information over the storage space as viewed from the AR device comprises rendering the supplementary information in a side region of the storage space as viewed from the AR device. Information such as a simulated "data big screen" can be displayed at the "top" of the storage space within the field of view, and navigation information can be displayed in the center. For example, as shown in FIG. 7, the supplementary information displayed in the left side region is competitive data, including rankings; the supplementary information displayed on the right side is the task list, task completion progress, and time; navigation information is displayed in the center region; and simulated "data big screen" information such as stock quantities is displayed at the top.

Figure 8:
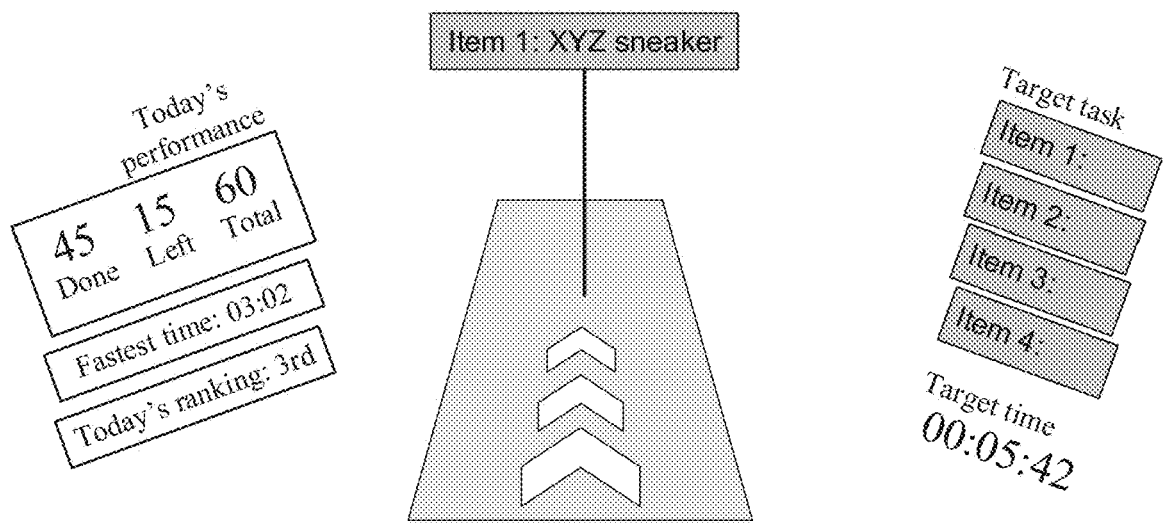

In some embodiments, the side region's supplementary information mentioned above can be displayed during the initial phase of the task, and as the user travels, carrying the AR device, the side region in the field of vision can shift back beyond the line of sight, as shown in FIG. 8. That is, the supplementary information may be moved outside of the field of view of the AR device, when the AR device approaches the target stored object. Thus, the field of view can open up as much as possible, for a better display of the route navigation information. Further, in response to the AR device's user's line of sight focuses on the side region, the supplementary information of the side region may be moved inside the field of view of the AR device. When an event is detected in which the user's line of sight focuses on the side region, the supplementary information of the side region can be moved back to within the field of view, in order for the user to view details or conduct operations such as making further selections.

Figures 1, 9:
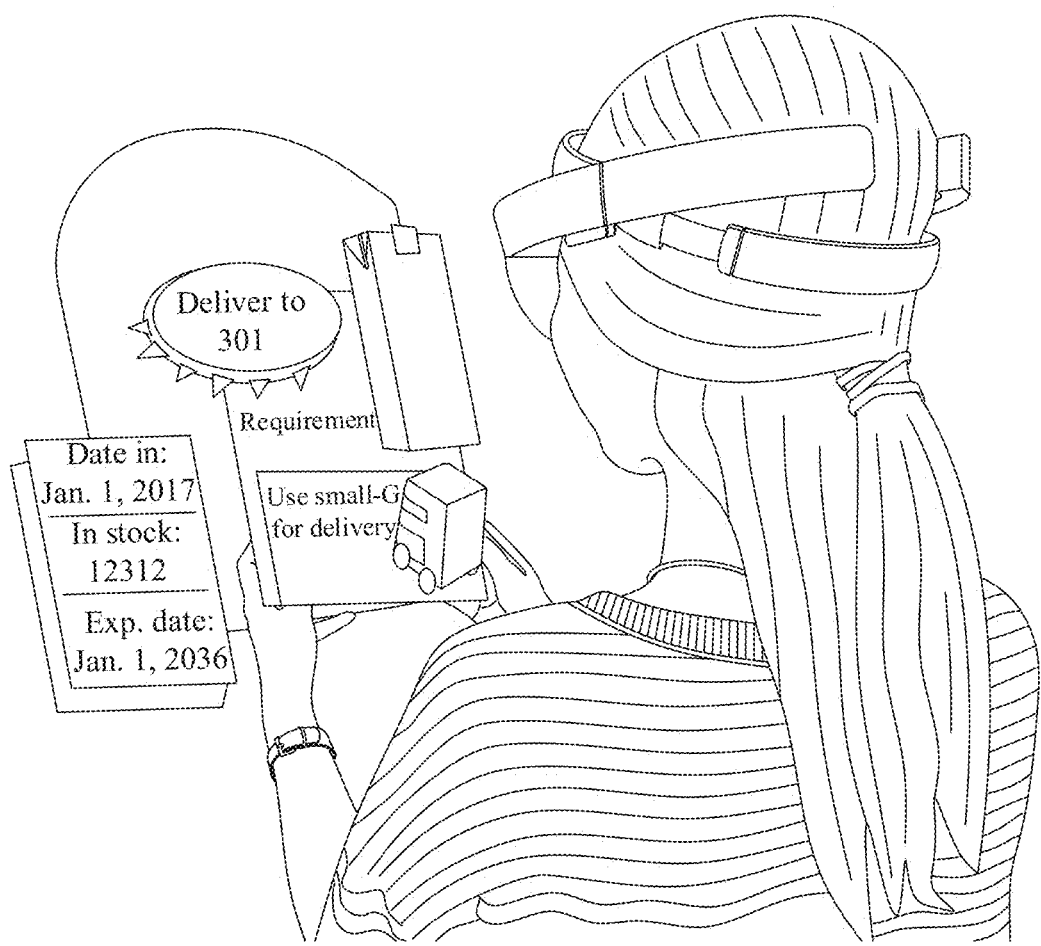
Figures 2, 9:
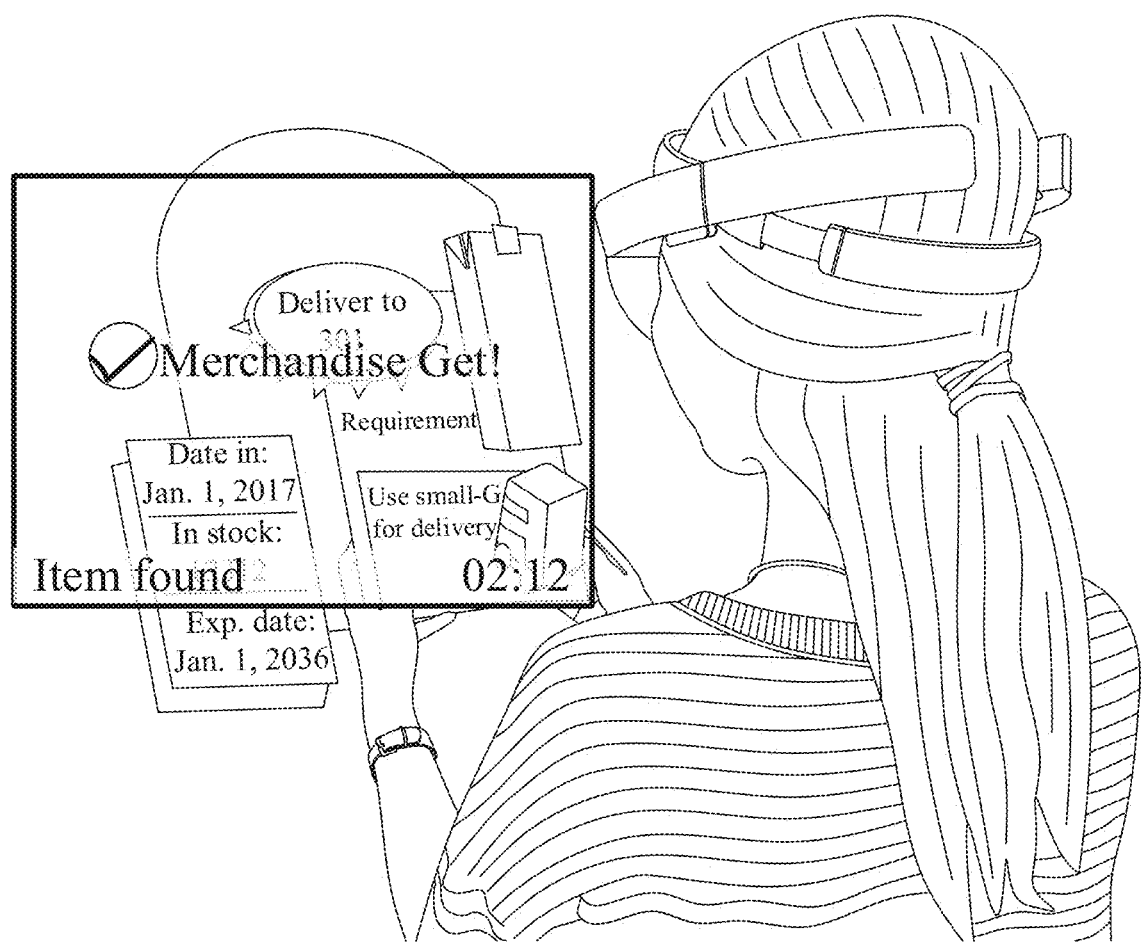
Figures 3, 9:
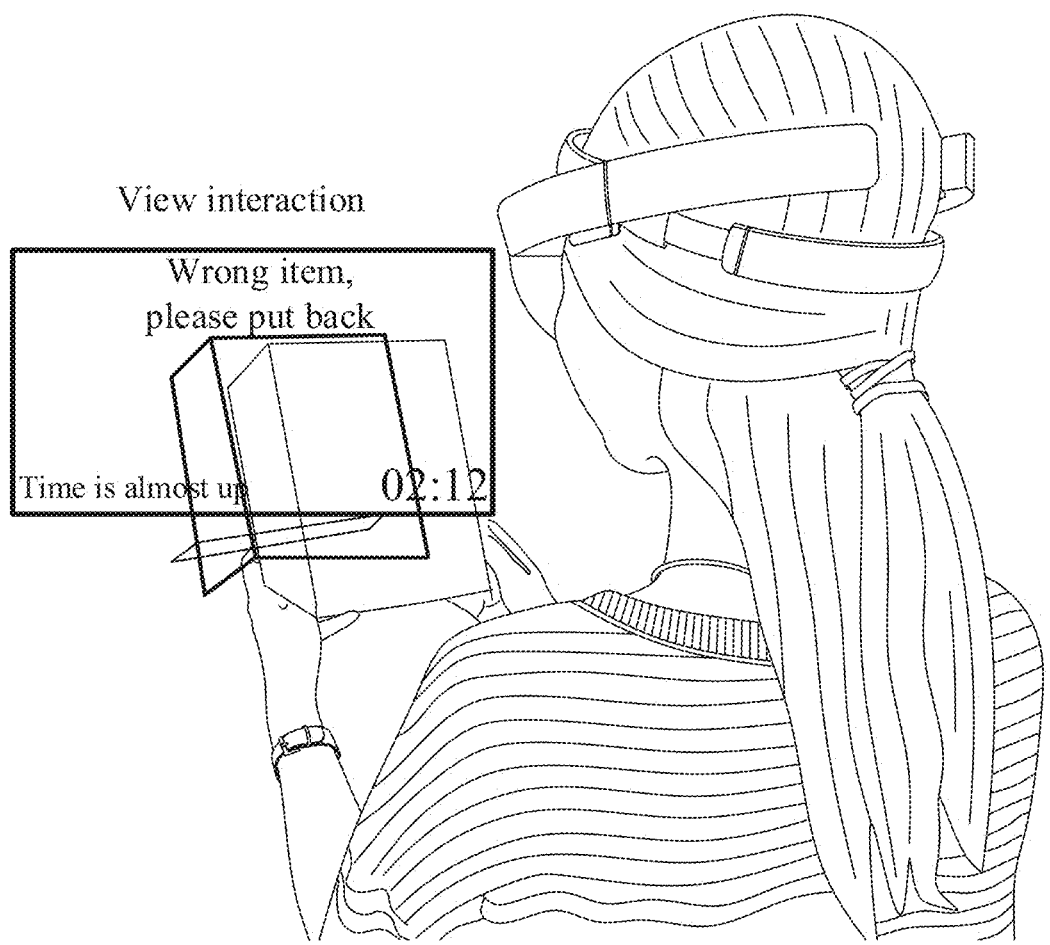

After a user travels according to navigation information and retrieves a stored object from a storage location, the retrieved stored object can be scanned, the details of the stored object can be identified, and these details can be provided through the AR device within the field of view. For example, as shown in FIG. 9-1, after the user retrieves a stored object, it is possible to look through the AR glasses and view its specific details, including storage date, stock quantity, shelf life, etc. Here, there can be multiple modes of identifying the stored object. For example, in one mode, a code scanning device can be installed on the AR device. Thus, because the external packaging of stored objects usually has graphic code information such as a barcode or QR code, specific details can be identified through code scanning. In another mode, computer vision can be used to identify the details of a stored object. For example, through machine learning, graphic codes, such as barcodes, of the stored objects can be studied in advance, information such as certain feature points in the graphic code can be recorded, and the associations between feature points and details can be saved. Thus, after a user retrieves a stored object, it is possible to identify the corresponding stored object and determine the corresponding details, etc., by scanning the graphic code and conducting a comparison with the previously saved feature points.

After identifying a stored object, it is also possible to determine whether the retrieved stored object is the target stored object of the current task. If it is, success information can be provided through the AR device. As shown in FIG. 9-2, it can be displayed as "merchandise retrieved." In addition, a success message notification can be sent to a server, and based on this, the server can register "removed-from-stock" for the data object corresponding to the target stored object. If the retrieved stored object is not the target stored object of the current task, error information can be provided through the AR device. For example, as shown in FIG. 9-3, it can be displayed as "Wrong item, please put it back," etc. Thus, in response to detecting a retrieval of a stored object from a corresponding storage location, the retrieved stored object may be identified. Details of the stored object may be rendered through the AR device to determine whether the retrieved stored object corresponds to the target stored object of the current task. In response to determining that the retrieved stored object corresponds to the target stored object of the current task, success information may be rendered through the AR device; and in response to determining that the retrieved stored object does not correspond to the target stored object of the current task, error information may be rendered through the AR device.

In addition, after the task has been completed, it is possible to provide statistical information regarding the completion of this task. For example, as shown in FIG. 10, information of completing the task can be provided, and it can also include information such as total elapsed time and task score. In addition, medals and titles can be awarded, etc.

In summary, consistent with the embodiments of the present disclosure, a three-dimensional spatial model of the inside of a target storage space can be saved in an AR device in advance, in which information of the storage location of the stored object in the storage space can be saved. Thus, after determining the target stored object to be processed, the target storage location of the target stored object can be determined based on the three-dimensional spatial model, a navigation route can be calculated based on the location information of the AR device and the target storage location, and when the AR device is carried around, corresponding visual navigation information can be rendered over the storage space within the field of view through the AR device. That is, after the user enters the storage space, they can use an AR device to view "augmented" information. This type of information can be navigational in nature. Thus, the target stored object can be found by traveling directly according to navigation information, and the collection task can be completed. Therefore, the user does not need to be familiar with the storage space layout in advance, and does not need to remember information such as the storage location of stored objects. Therefore, it can lower the user's study costs. Also, through navigation information, it is possible to improve the implementation efficiency and accuracy of operations such as order item picking.

Another method for providing information of stored object is provided, and the method may be implementable by a server. The server may couple to or otherwise communicate with the client terminal described above. For example, referring to FIG. 11, a method for providing information of stored object is provided, and this method can comprise the following steps.

S1101 may include generating a three-dimensional spatial model of a storage space, the three-dimensional spatial model comprising storage location information corresponding to at least one object stored inside the storage space. For example, a server provides a three-dimensional spatial model of the inside of the target storage space, and storage location information corresponding to at least one stored object inside the storage space is saved in the three-dimensional spatial model.

S1102 may include providing the three-dimensional spatial model to a client terminal, causing the client terminal to determine a target object stored inside the storage space, determine a target storage location of the target stored object based on the three-dimensional spatial model, determine a target storage location of the target stored object based on the three-dimensional spatial model, obtain a navigation route based on location information of an augmented reality (AR) device and the target storage location, and render corresponding navigation information over the storage space as viewed from the AR device. For example, the three-dimensional spatial model's information is provided to a client terminal, for the client terminal to, after determining the target stored object, determine the target storage location of the target stored object based on the three-dimensional spatial model; a navigation route is calculated based on the location information of the AR device and the target storage location, and corresponding visual navigation information is rendered over the storage space within the field of view of the AR device when the AR device is carried around.

For establishing three-dimensional spatial models and related implementations such as the client terminal's use of three-dimensional spatial models to provide navigation information, reference can be made to various embodiments above, which will not be reiterated here.

In some embodiments, if the target stored object is to be obtained, the client terminal can obtain a collection task from the server. Correspondingly, the server can receive a collection task request from the client terminal, generate a collection task, and distribute the collection task including information of at least one target stored object to the client terminal. The collection task includes information on at least one stored object. Thus, the client terminal can determine the target stored object to be processed based on the collection task.

In addition, storage space inventory information for each stored object may be saved in the server, including stock quantity, inventory status, etc. Therefore, in some embodiments, the server can also receive a notification message of successful retrieval of the target stored object from the client terminal, and update inventory information of the target stored object based on the notification message. For example, it can conduct inventory deductions or locking, etc., for the successfully processed stored object.

In the various embodiments above, a method for providing information of stored object is provided. In some embodiments, this method can be applied in a variety of application scenarios. For example, one possible application scenario is: for a storage space such as a warehouse, an order item picker often needs to go to the warehouse to conduct "order item picking." The "order item picking" can refer to obtaining merchandise from the warehouse, in order to execute subsequent tasks such as shipping. In such application scenarios, the storage space corresponds to the warehouse, and the stored object corresponds to merchandise stored in the warehouse. Therefore, to boost order item picking efficiency and lower order item picker study costs, a three-dimensional spatial model corresponding to the real warehouse can be established, saving the storage location information for at least one piece of merchandise in the warehouse. Thus, this type of three-dimensional spatial model can be used to conduct AR device-based indoor navigation, thus boosting order item picking efficiency. A detailed explanation of the implementation embodiments is given below.

Figure 12:
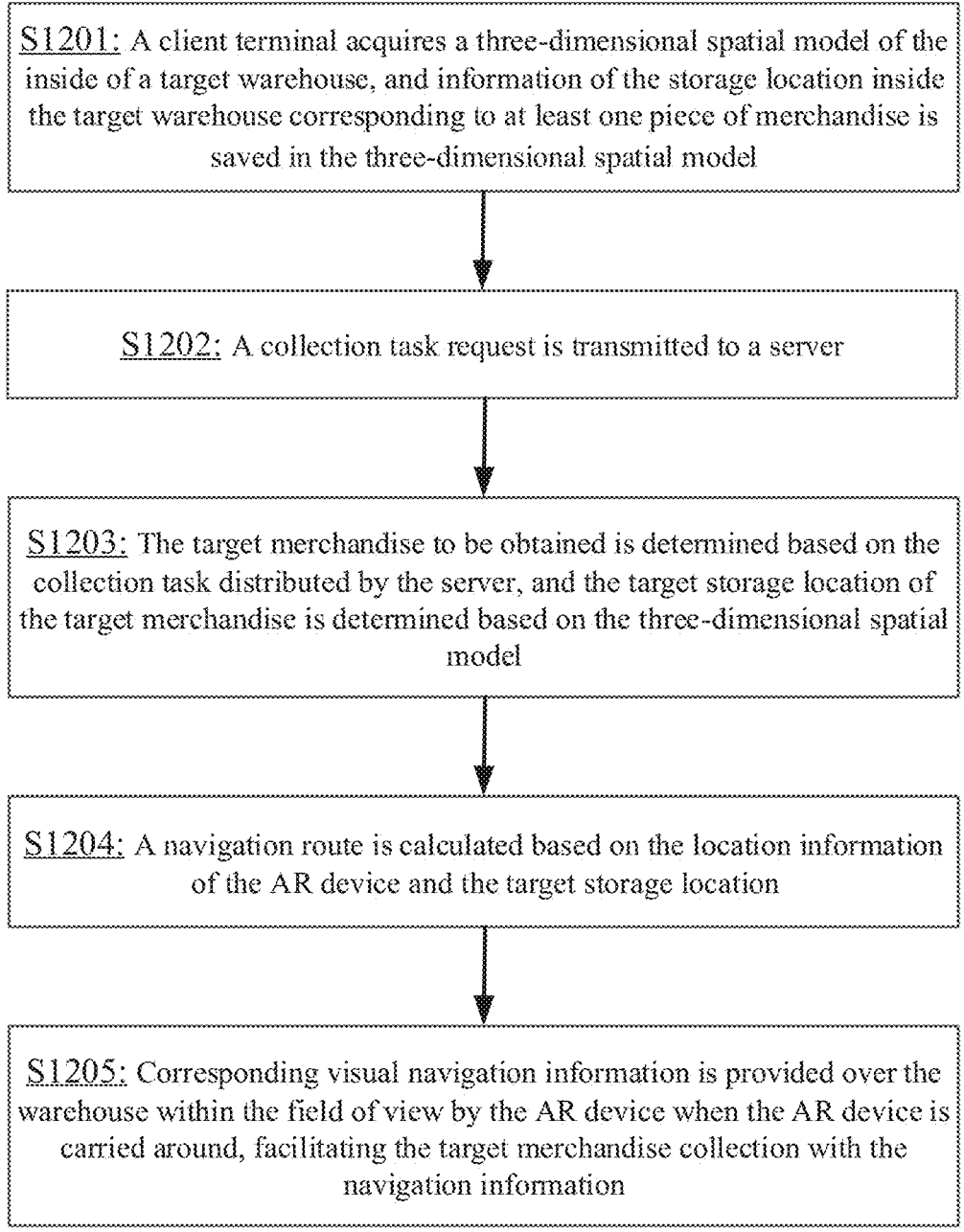
FIG. 12 is a flowchart of the third method consistent with the embodiments of the present disclosure.

Referring to FIG. 12, a method for the collection processing of goods stored in a warehouse is provided, and the method can comprise the following steps.

S1201: A client terminal acquires a three-dimensional spatial model of the inside of a target warehouse, and information of the storage location inside the target warehouse corresponding to at least one piece of merchandise is saved in the three-dimensional spatial model.

S1202: A collection task request is transmitted to a server.

After spatial matching is completed through the three-dimensional spatial model, the client terminal can notify server that it is ready and can submit a collection task request. After the server receives this request, the server can generate a current collection task based on the "task pool" and allocate it to the client terminal.

S1203: The target merchandise to be obtained is determined based on the collection task distributed by the server, and the target storage location of the target merchandise is determined based on the three-dimensional spatial model.

S1204: A navigation route is calculated based on the location information of the AR device and the target storage location.

S1205: Corresponding visual navigation information is provided over the warehouse within the field of view of the AR device when the AR device is carried around, facilitating the target merchandise collection with the navigation information.

Various embodiments described above, including the implementation of "floor guidance" and "visual guidance", etc. can be referred to, in which the storage space can be represented as a "warehouse," and the stored object can be represented as "merchandise." Therefore, similar descriptions will not be reiterated here.

In summary, a three-dimensional spatial model of a target warehouse can be established in advance, in which information of the storage location of goods in the warehouse can be saved. Thus, this three-dimensional spatial model can be saved to an AR device. When a user wearing this AR device goes to the warehouse to conduct order item picking, "augmented" visual navigation information can be viewed through the AR device, to enhance the order item picking efficiency and lower order item picker study costs.

Figure 13:
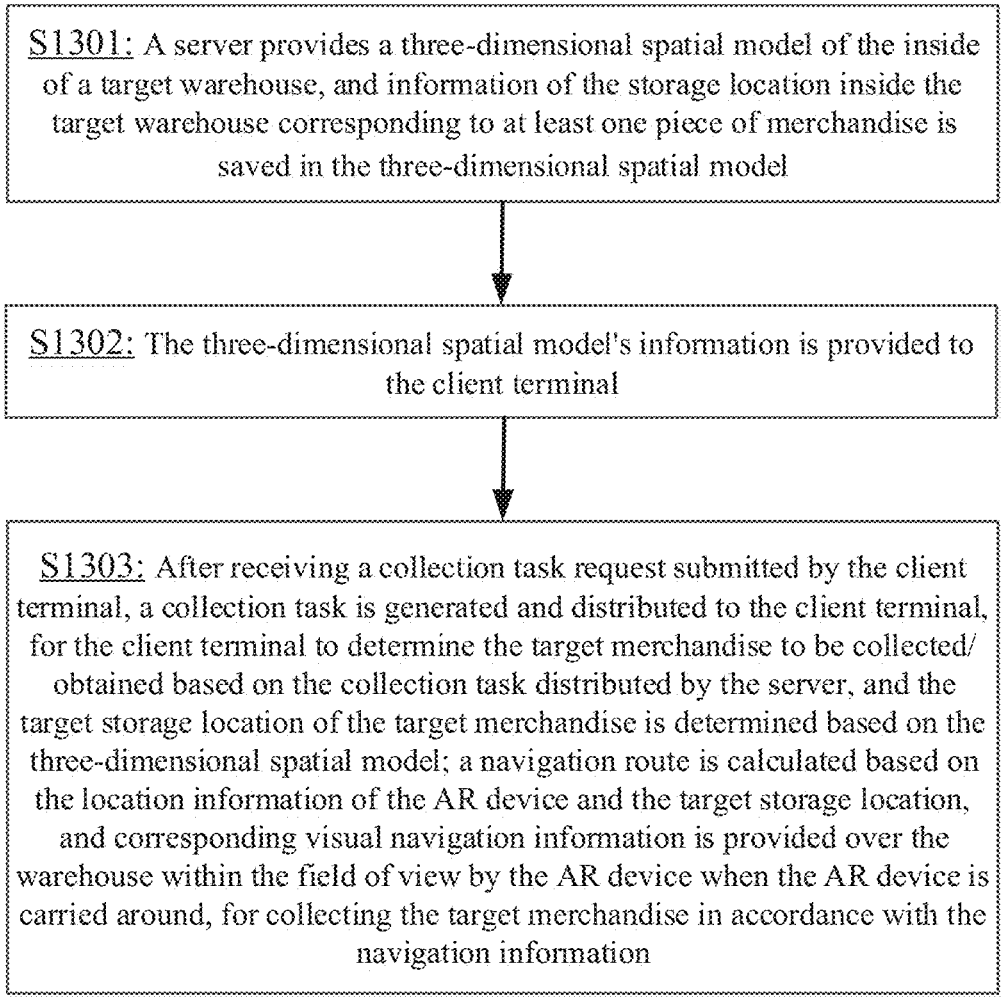
FIG. 13 is a flowchart of the fourth method consistent with the embodiments of the present disclosure.

Referring to FIG. 13, a method for the collection processing of goods stored in a warehouse is provided from the point of view of the server. This method can comprise the following steps.

S1301: A server provides a three-dimensional spatial model of the inside of a target warehouse, and information of the storage location inside the target warehouse corresponding to at least one piece of merchandise is saved in the three-dimensional spatial model.

S1302: The three-dimensional spatial model's information is provided to the client terminal.

After generating the three-dimensional space, the server can directly provide the three-dimensional space to the client terminal. At this time, the client terminal can pair up with a target warehouse, or three-dimensional spatial models corresponding to multiple warehouses can be saved in the client terminal. When it is necessary to collect items from a warehouse, the corresponding three-dimensional spatial model can be locally found in the client terminal. Or, the generated three-dimensional spatial model can be saved to the server; that is, the server can save three-dimensional spatial models corresponding to multiple warehouses. When the client terminal needs to enter a warehouse to execute a collection task, it can request the three-dimensional spatial model corresponding to this warehouse from the server.

S1303: After receiving a collection task request submitted by the client terminal, a collection task is generated and distributed to the client terminal, for the client terminal to determine the target merchandise to be collected/obtained based on the collection task distributed by the server, and the target storage location of the target merchandise is determined based on the three-dimensional spatial model; a navigation route is calculated based on the location information of the AR device and the target storage location, and corresponding visual navigation information is provided over the warehouse within the field of view of the AR device when the AR device is carried around, for collecting the target merchandise in accordance with the navigation information.

Figure 14:
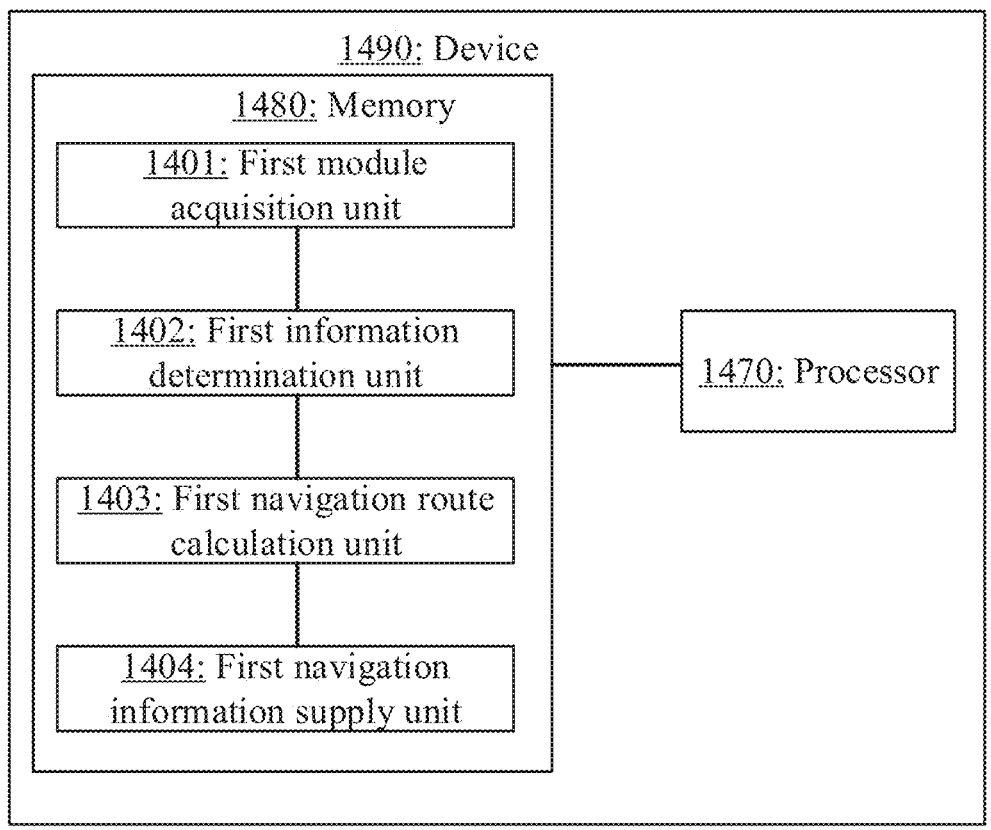
FIG. 14 is a diagram of the first device consistent with the embodiments of the present disclosure.

In some embodiments of the present disclosure, a device 1490 providing information of stored object is provided. This device 1490 can be implemented on a client terminal. See FIG. 14. In some embodiments, the device 1490 may comprise: a first model acquisition unit 1401, configured to acquire a three-dimensional spatial model of the inside of the target storage space, wherein storage location information corresponding to at least one stored object inside the storage space is saved in the three-dimensional spatial model; a first information determination unit 1402, configured to determine the target stored object, wherein the target storage location of the target stored object is determined based on the three-dimensional spatial model; a first navigation route calculation unit 1403, configured to calculate a navigation route based on the location information of the AR device and the target storage location; a first navigation information supply unit 1404, configured to provide corresponding visual navigation information over the storage space within the field of view of the AR device when the AR device is carried around. In some embodiments, the device 1490 may comprise a processor 1470 and a memory 1480 storing instructions that when executed by the processor 1470, cause the device 1490 to perform various steps and methods described herein. The memory 1480 may be non-transitory and computer-readable, and the stored instructions may include the units as discussed above.

In some embodiments, the first navigation information supply unit 1404 comprises: a floor guidance sub-unit, configured to provide visual travel direction information through the AR device on the floor of the storage space within the field of view.

Or the first navigation information supply unit 1404 can also comprise: a visual guidance sub-unit, configured to provide visual target storage location information over the storage space within the field of view when the target storage location is present within the field of view.

In some examples, the floor guidance sub-unit and visual guidance sub-unit can both be present.

In some embodiments, if the storage space includes a plurality of racks, the storage location information corresponding to at least one stored object inside the storage space saved in the three-dimensional spatial model comprises: location information for a rack storing at least one stored object.

The information determination unit can be configured to determine the location of the target rack holding the target stored object based on the three-dimensional spatial model.

The visual guidance sub-unit specifically can be configured to provide visual information for the location of the target rack within the field of view when the target rack appears within the field of view.

In addition, if every rack in the storage space comprises a plurality of unit storage zones, a unit storage zone can be configured to store objects of the same stock keeping unit SKU.

The storage location information corresponding to at least one stored object inside the storage space saved in the three-dimensional spatial model also comprises unit storage zone location information for at least one stored object on the rack.

The information determination unit can also be configured to determine the location of the target unit storage zone of the target stored object on the rack based on the three-dimensional spatial model.

The visual guidance sub-unit can also be configured to provide visual information for the location of the target unit storage zone within the field of view when the target unit storage zone appears within the field of view.

In addition, this device can also comprise a rack identifier unit, configured to provide visual rack identifier information within the field of view, a stored object information unit, configured to provide visual information for the stored object stored on the rack within the field of view.

In some embodiments, this device can also comprise a stock quantity information unit, configured to provide information regarding the stock quantity of the target stored object, over the storage space within the field of view of the AR device.

In addition, this device can also comprise a supplementary information unit, configured to provide visual supplementary information over the storage space within the field of view of the AR device. The supplementary information comprises task list information and task processing progress and/or task processing time information. The supplementary information unit can be configured to provide supplementary information in the side region of the storage space within the field of view.

To avoid interfering with navigation information, this device can also comprise an information moving unit, configured to move the supplementary information in the side region outside of the field of view when the AR device approaches the target stored object. In addition, the information moving unit can also be configured to move the supplementary information of the side region inside the field of view when an event that the user's line of sight focuses on the side region is detected.

In some embodiments, the information determination unit can comprise: a request sub-unit, configured to transmit collection task requests to a server, and a task receiver sub-unit, configured to receive a collection task allocated by the server and determine the target stored object to be processed based on stored object's information included in the collection task.

Here, when the collection task includes multiple stored objects, multiple stored objects are determined.

The navigation route calculation unit can comprise a processing sequence determination sub-unit, configured to determine a processing sequence for the target stored objects based on the location information of the AR device and the target storage location of each target stored object, and a route calculation sub-unit, configured to provide a navigation route from the current location to the first target stored object and navigation routes between all subsequent target stored objects according to the processing sequence.

In addition, this device can also comprise an identification unit, configured to identify the retrieved stored object when an event is detected in which a stored object is retrieved from its storage location; a determination unit, configured to provide the details of the stored object through the AR device, and determine whether the retrieved stored object is the target stored object of the current task; and a collection result unit, configured to provide success information through the AR device if the determination result of the determination unit is yes, or else to provide error information by the AR device.

Figure 15:
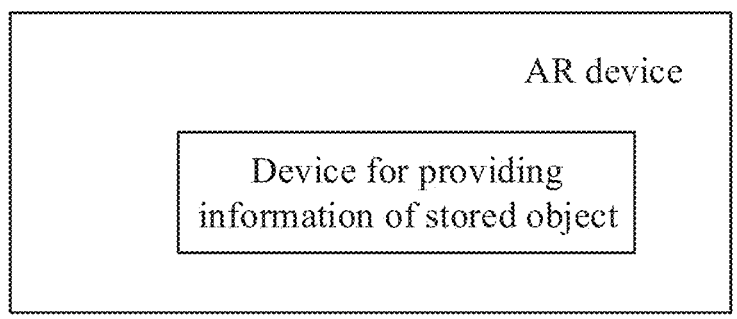
FIG. 15 is a diagram of the first AR device consistent with the embodiments of the present disclosure.

Corresponding to the client terminal described above, some embodiments of the present disclosure also provide an augmented reality AR device. See FIG. 15. The AR device can comprise one or more of the foregoing devices providing information of stored object (e.g., one or more devices 1490). This AR device can be an integrated AR device integrating screen display, storage, and calculation.

Figure 16:
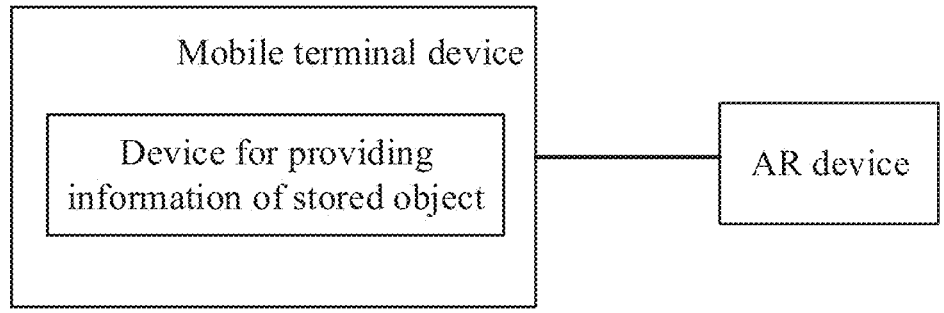
FIG. 16 is a diagram of the first mobile terminal device consistent with the embodiments of the present disclosure.

In addition, referring to FIG. 16, some embodiments of the present disclosure also provide a mobile terminal device. The mobile terminal device comprises one or more of the foregoing devices providing information of stored object (e.g., one or more devices 1490). Also, the mobile terminal device can be configured to connect to an augmented reality AR device. This AR device may be an AR device providing only a display function. The mobile terminal device can be a smart terminal device such as a cell phone.

Figure 17:
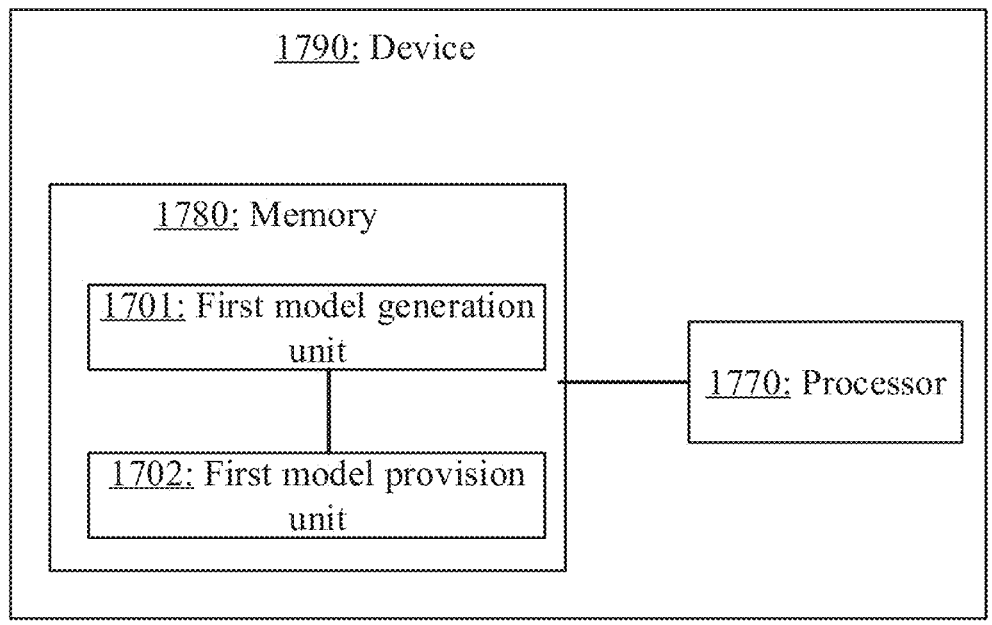
FIG. 17 is a diagram of the second device consistent with the embodiments of the present disclosure.

Some embodiments of the present disclosure also provide a device 1790 providing information of stored object, and this device 1790 can be implemented on a server. The device 1790 may include a first model generation unit 1701, configured to generate a three-dimensional spatial model of the inside of the target storage space, where storage location information corresponding to at least one stored object inside the storage space is saved in the three-dimensional spatial model; and a first model provision unit 1702, configured to provide the client terminal with the three-dimensional spatial model's information, for the client terminal, after determining the target stored object, to determine the target storage location of the target stored object based on the three-dimensional spatial model. A navigation route is calculated based on the location information of the AR device and the target storage location, and corresponding visual navigation information is rendered over the storage space within the field of view of the AR device when the AR device is carried around. In some embodiments, as shown in FIG. 17, this device 1790 may comprise a processor 1770 and a memory 1780 storing instructions that when executed by the processor 1770, cause the device 1790 to perform various steps and methods described herein. The memory 1780 may be non-transitory and computer-readable, and the stored instructions may comprise the units as described above.

Figure 18:
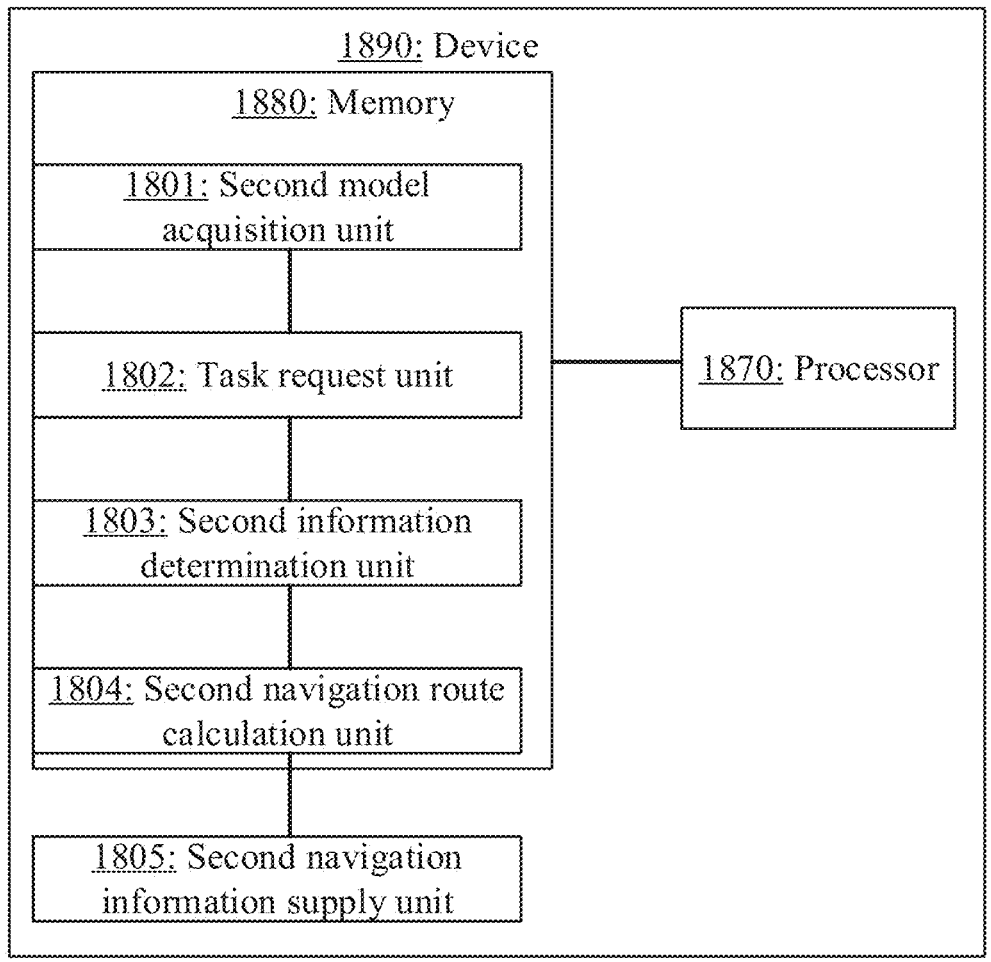
FIG. 18 is a diagram of the third device consistent with the embodiments of the present disclosure.

In some embodiments of the present disclosure, a device 1890 for the collection processing of goods stored in a warehouse is provided, as shown in FIG. 18. This device 1890 can be implemented on a client terminal. The device 1890 may comprise a second model acquisition unit 1801, configured to acquire a three-dimensional spatial model of the inside of a target warehouse, where information of the storage location inside the target warehouse corresponding to at least one piece of merchandise is saved in the three-dimensional spatial model; a task request unit 1802, configured to transmit collection task requests to a server; a second information determination unit 1803, configured to determine target merchandise based on the collection task distributed by the server, where the target storage location of the target merchandise is determined based on the three-dimensional spatial model; a second navigation route calculation unit 1804, configured to calculate a navigation route based on the location information of the AR device and the target storage location; and a second navigation information supply unit 1805, configured to provide corresponding visual navigation information in the warehouse within the field of view of the AR device when the AR device is carried around, for collecting the target merchandise in accordance with the navigation information. In some embodiments, the device 1890 may comprise a processor 1870 and a memory 1880 storing instructions that when executed by the processor 1870, cause the device 1890 to perform various steps and methods described herein. The memory 1880 may be non-transitory and computer-readable, and the stored instructions may comprise the units as described above.

In some embodiments, the second navigation information supply unit comprises a floor guidance sub-unit, configured to provide visual travel direction information over a warehouse floor within the field of view of the AR device. Or, the second navigation information supply unit comprises a visual guidance sub-unit, configured to provide visual target storage location information in the warehouse within the field of view when the target storage location appears within the field of view.

Here, the warehouse includes a plurality of racks, and information of the storage location inside the warehouse corresponding to at least one piece of merchandise is saved in the three-dimensional spatial model, comprising: location information for the rack storing the one or more pieces of merchandise. The second information determination unit is configured to determine the location of the target rack holding the target stored object based on the three-dimensional spatial model. The visual guidance sub-unit is configured to provide visual information for the location of the target rack within the field of view when the target rack appears within the field of view.

If every rack in the warehouse comprises a plurality of unit storage zones, a unit storage zone is configured to store goods of the same stock keeping unit SKU; the information of the storage location inside the warehouse corresponding to at least one piece of merchandise saved in the three-dimensional spatial model also comprises: information on the unit storage zone location on the rack for the one or more pieces of merchandise.

Therefore, the second information determination unit can also be configured to determine the location of the target unit storage zone of the target stored object on the rack based on the three-dimensional spatial model.

The visual guidance sub-unit is also configured to provide visual information for the location of the target unit storage zone within the field of view when the target unit storage zone appears within the field of view.

Figure 19:
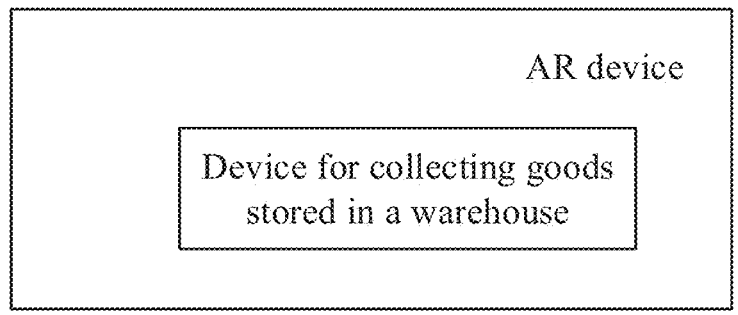
FIG. 19 is a diagram of the second AR device consistent with the embodiments of the present disclosure.

Corresponding to the aforementioned device, an augmented reality AR device is provided. As shown in FIG. 19, the AR device comprises the aforementioned device for the collecting goods stored in a warehouse (e.g., the device 1890). This AR device is an integrated AR device with screen display, storage, and calculation functions.

Figure 20:
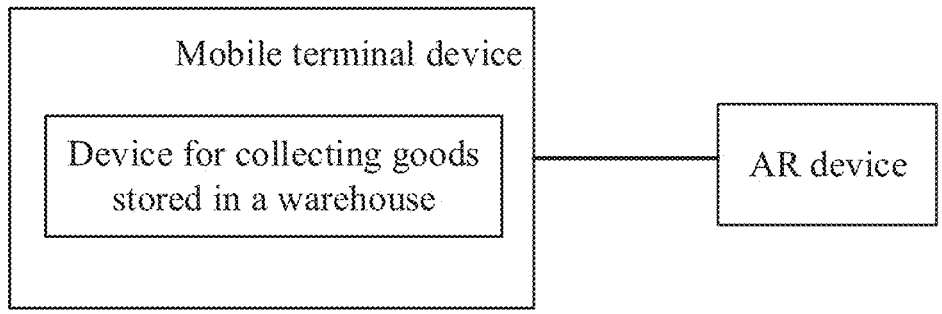
FIG. 20 is a diagram of the second mobile terminal device consistent with the embodiments of the present disclosure.

In addition, referring to FIG. 20, a mobile terminal device is provided. The mobile terminal device may comprise a device for collecting goods stored in a warehouse (e.g., the device 1890), and the mobile terminal device is configured to connect to an augmented reality AR device. This AR device may provide only a display function. The mobile terminal device can be a smart terminal device such as a cell phone.

Figure 21:
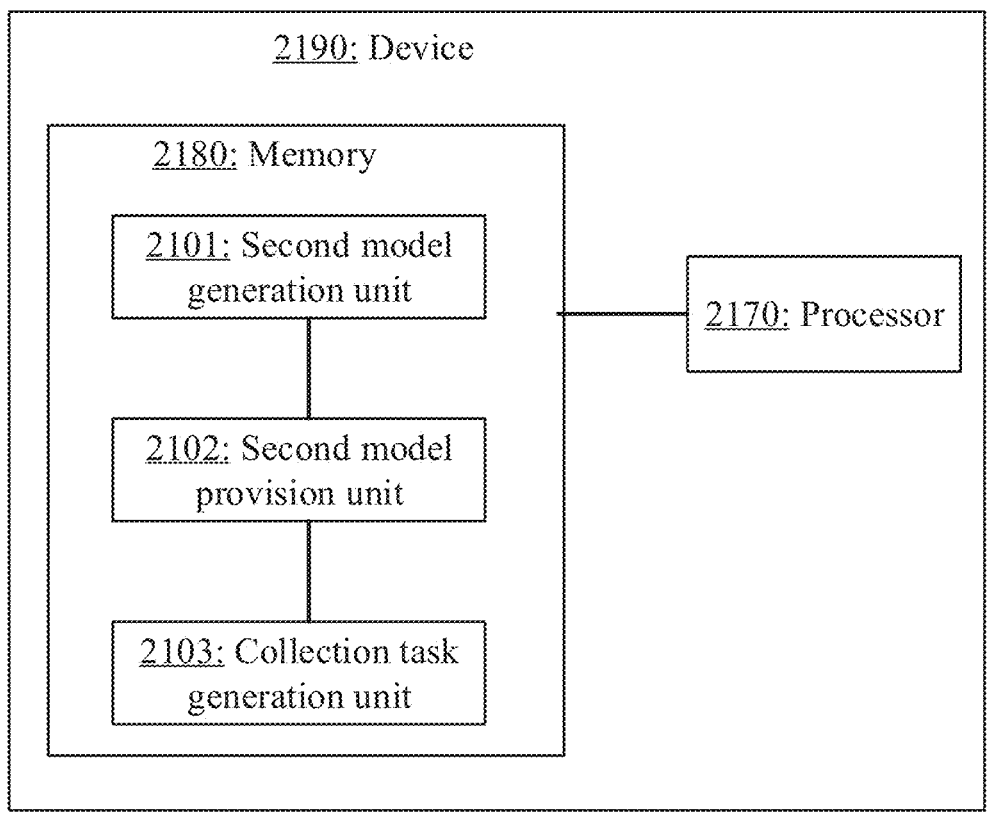
FIG. 21 is a diagram of the fourth device consistent with the embodiments of the present disclosure.

In some embodiments of the present disclosure, a device 2190 for collecting goods stored in a warehouse is provided. This device 2190 can be implemented on a server. The device 2190 may comprise a second model generation unit 2101, configured to generate a three-dimensional spatial model of the inside of a target warehouse, where information of the storage location inside the target warehouse corresponding to at least one piece of merchandise is saved in the three-dimensional spatial model; a second model provision unit 2102, configured to provide the client terminal with the three-dimensional spatial model's information; and a collection task generation unit 2103, configured to generate a collection task and distribute it to the client terminal after receiving a collection task request submitted by the client terminal, for the client terminal to determine the target merchandise based on the collection task distributed by the server. The target storage location of the target merchandise is determined based on the three-dimensional spatial model, a navigation route is calculated based on the location information of the AR device and the target storage location, and corresponding visual navigation information is provided in the warehouse within the field of view of the AR device when the AR device is carried around, for collecting the target merchandise in accordance with the navigation information. In some embodiments, as shown in FIG. 21, the device 2190 may comprise a processor 2170 and a memory 2180 storing instructions that when executed by the processor 2170, cause the device 2190 to perform various steps and methods described herein. The memory 2180 may be non-transitory and computer-readable, and the stored instructions may can comprise the units as described above.

In summary, consistent with the embodiments of the present disclosure, the client terminal can acquire a three-dimensional spatial model of the inside of the target storage space in advance, wherein information of the storage location of the stored object in the storage space is saved. Thus, after determining the target stored object to be processed, it is possible to determine the target storage location of the target stored object based on the three-dimensional spatial model and calculate a navigation route based on the location information of the AR device and the target storage location. When the AR device is carried around, corresponding visual navigation information is rendered over the storage space within the field of view of the AR device. That is, after the user enters the storage space, the AR device can be used to view "augmented" information. This type of information may be navigational in nature. Thus, the target stored object can be found by traveling directly according to navigation information, and the collection task can be completed. Therefore, the user does not need to be familiar with the storage space layout, and does not need to remember information such as the storage location of stored objects. Therefore, it can lower the user's study costs. Also, through navigation information, it is possible to improve the implementation efficiency and accuracy of operations such as order item picking.

Based on the above implementation manner descriptions, those skilled in the art can clearly understand that the present disclosure can be implemented with a combination of software and the necessary general-purpose hardware platforms. On the basis of this understanding, the essence of the present disclosure's technical schemes, or the parts contributing to prior art, can be embodied in software product form. This computer software product can be stored in a storage medium, such as ROM/RAM, disks, optical disks, etc., and includes a number of commands to cause a computer device (it can be a personal computer, server, or network device) to execute the methods of each of the embodiments or certain parts of the embodiments of the present disclosure.

The embodiments of this description are described progressively. For the shared parts of the embodiments, references can be made to each other. The focus of explanation in all of the embodiments is their differences from the other embodiments. In particular, regarding systems or system embodiments, because they can be similar method embodiments, their descriptions may be relatively simple, and referring to the method embodiment for an explanation is sufficient with regard to related points. The systems and system embodiments described above are merely illustrative, wherein the units described as separate parts may or may not be physically separated, and parts displayed as units may or may not be physical units, e.g., they can be located in one location, or they can be distributed among multiple networked units. Some or all of the modules may be selected to achieve the goals of the embodiment scheme as needed. Those possessing ordinary skill in the art can understand and implement this without creative efforts.

A detailed explanation of the methods and devices for providing information of stored object is given above. Examples are given to describe the principles and implementation manner. The purpose of the foregoing embodiment descriptions is only to provide an understanding of the methods and core concepts. For those possessing ordinary skill in the art, changes could be made in terms of the implementation manner and scope of application based on the concepts of the present disclosure. The content of the present description shall not be interpreted as limiting the present disclosure.

The invention claimed is:

1. A method for providing information of a stored object through an augmented reality (AR) device including one or more sensors, comprising:
   acquiring a three-dimensional spatial model of a storage space, the three-dimensional spatial model comprising storage location information corresponding to at least one object stored inside the storage space;
   determining a target object stored inside the storage space;
   conducting spatial matching between the three-dimensional spatial model and the storage space through the one or more sensors of the AR device to determine a target storage location of the target stored object based on the three-dimensional spatial model;
   generating a navigation route based on location information of the AR device and the target storage location;
   rendering, on a screen display, navigation information indicating the navigation route over the storage space within a field of view of the AR device;
   rendering, on the screen display, supplementary information including task list information over the storage space and in a side region of the storage space within the field of view of the AR device;

moving the supplementary information outside of the field of view of the AR device when the AR device approaches the target stored object;

detecting, using the one or more sensors of the AR device, whether a line of sight of a user of the AR device focuses on the side region of the storage space within the field of view of the AR device; and in response to detecting that the line of sight of the user of the AR device focuses on the side region of the storage space, moving the supplementary information inside the field of view of the AR device.

2. The method according to claim 1, wherein rendering the navigation information indicating the navigation route over the storage space comprises:

rendering travel direction information on a floor of the storage space as viewed from the AR device.

3. The method according to claim 1, wherein rendering the navigation information indicating the navigation route over the storage space comprises:

when the target storage location appears in the AR device's field of view, rendering information of the target storage location over the storage space as viewed from the AR device.

4. The method according to claim 3, wherein:

the storage space includes a plurality of racks;

the storage location information comprises location information of a target rack storing the target stored object;

conducting the spatial matching between the three-dimensional spatial model and the storage space through the one or more sensors of the AR device to determine the target storage location of the target stored object based on the three-dimensional spatial model comprises determining a location of the target rack storing the target stored object based on the three-dimensional spatial model; and rendering the information of the target storage location over the storage space as viewed from the AR device comprises rendering information of the location of the target rack when the target rack appears in the field of view of the AR device.

5. The method according to claim 4, wherein:

every rack in the storage space comprises a plurality of unit storage zones;

each of the unit storage zones is configured to store stored objects of a same stock keeping unit (SKU);

the storage location information further comprises unit storage zone location information for the at least one stored object on the rack;

conducting the spatial matching between the three-dimensional spatial model and the storage space through the one or more sensors of the AR device to determine the target storage location of the target stored object based on the three-dimensional spatial model further comprises determining a location of a target unit storage zone of the target stored object on the rack based on the three-dimensional spatial model; and rendering the information of the target storage location over the storage space as viewed from the AR device further comprises rendering information of the location of the target unit storage zone when the target unit storage zone appears in the field of view of the AR device.

6. The method according to claim 4, further comprising: rendering rack identifier information of each rack in the field of view.

7. The method according to claim 5, further comprising: rendering information of the target stored object stored on the rack.

8. The method according to claim 1, further comprising: rendering information regarding the target stored object stock quantity over the storage space as viewed from the AR device.

9. The method according to claim 1, wherein:

the supplementary information further comprises task processing progress and/or task processing time information.

10. The method according to claim 1, wherein determining the target object stored inside the storage space comprises:

transmitting a collection task request to a server; and receiving a collection task allocated by the server, and determining the target stored object based on the target stored object's information included in the collection task.

11. The method according to claim 10, wherein:

the collection task includes multiple stored objects including the target stored object; and obtaining the navigation route based on the location information of the AR device and the target storage location comprises:

determining a processing sequence for the stored objects based on the location information of the AR device and a storage location of each of the stored objects; and obtaining a navigation route among the stored objects according to the processing sequence.

12. The method according to claim 1, further comprising:

in response to detecting a retrieval of a stored object from a corresponding storage location, identifying the retrieved stored object;

determining whether the retrieved stored object corresponds to the target stored object;

if the retrieved stored object corresponds to the target stored object of the current task, rendering success information through the AR device; and if the retrieved stored object does not correspond to the target stored object, rendering error information through the AR device.

13. A method for providing information of stored object, implementable on a server, the method comprising:

generating a three-dimensional spatial model of a storage space, the three-dimensional spatial model comprising storage location information corresponding to at least one object stored inside the storage space; and providing the three-dimensional spatial model to a client terminal, causing the client terminal to:

determine a target object stored inside the storage space;

conduct spatial matching between the three-dimensional spatial model and the storage space through one or more sensors of an augmented reality (AR) device to determine a target storage location of the target stored object based on the three-dimensional spatial model;

obtain a navigation route based on location information of an augmented reality (AR) device and the target storage location;

render, on a screen display, navigation information indicating the navigation route over the storage space within a field of view of the AR device;

render, on the screen display, supplementary information including task list information over the storage space and in a side region of the storage space within the field of view of the AR device;

move the supplementary information outside of the field of view of the AR device when the AR device approaches the target stored object;

detect, using the one or more sensors of the AR device, whether a line of sight of a user of the AR device focuses on the side region of the storage space within the field of view of the AR device; and in response to detecting that the line of sight of the user of the AR device focuses on the side region of the storage space, move the supplementary information inside the field of view of the AR device.

14. The method according to claim 13, further comprising:

receiving a collection task request from the client terminal; and distributing a collection task including information of the target stored object to the client terminal, the collection task causing the client terminal to determine the target stored object based on the collection task.

15. The method according to claim 14, further comprising:

receiving a notification of successful retrieval of the target stored object from the client terminal; and updating inventory information of the target stored object based on the notification.

16. A non-transitory computer-readable storage medium storing instructions that, when executed by an augmented reality (AR) device including one or more sensors, cause the AR device to perform a method for providing information of stored object, the method comprising:

acquiring a three-dimensional spatial model of a storage space, the three-dimensional spatial model comprising storage location information corresponding to at least one object stored inside the storage space;

determining a target object stored inside the storage space;

conducting spatial matching between the three-dimensional spatial model and the storage space through the one or more sensors of the AR device to determine a target storage location of the target stored object based on the three-dimensional spatial model;

generating a navigation route based on location information of the AR device and the target storage location;

rendering, on a screen display, navigation information indicating the navigation route over the storage space within a field of view of the AR device;

rendering, on the screen display, supplementary information including task list information over the storage space and in a side region of the storage space within the field of view of the AR device;

moving the supplementary information outside of the field of view of the AR device when the AR device approaches the target stored object;

detecting, using the one or more sensors of the AR device, whether a line of sight of a user of the AR device focuses on the side region of the storage space within the field of view of the AR device; and in response to detecting that the line of sight of the user of the AR device focuses on the side region of the storage space, moving the supplementary information inside the field of view of the AR device.

17. The non-transitory computer-readable storage medium according to claim 16, wherein rendering navigation information indicating the navigation route over the storage space comprises:

when the target storage location appears in the AR device's field of view, rendering information of the target storage location over the storage space as viewed from the AR device.

18. The non-transitory computer-readable storage medium according to claim 16, wherein the method further comprises:

rendering information regarding the target stored object stock quantity over the storage space as viewed from the AR device.

19. The non-transitory computer-readable storage medium according to claim 16, wherein determining the target object stored inside the storage space comprises:

transmitting a collection task request to a server; and receiving a collection task allocated by the server, and determining the target stored object based on the target stored object's information included in the collection task.

20. The non-transitory computer-readable storage medium according to claim 19, wherein:

the collection task includes multiple stored objects including the target stored object; and obtaining the navigation route based on the location information of the AR device and the target storage location comprises:

determining a processing sequence for the stored objects based on the location information of the AR device and a storage location of each of the stored objects; and obtaining a navigation route among the stored objects according to the processing sequence.

21. The non-transitory computer-readable storage medium according to claim 16, wherein the method further comprises:

in response to detecting a retrieval of a stored object from a corresponding storage location, identifying the retrieved stored object;

determining whether the retrieved stored object corresponds to the target stored object;

if the retrieved stored object corresponds to the target stored object, rendering success information through the AR device; and if the retrieved stored object does not correspond to the target stored object, rendering error information through the AR device.

22. A non-transitory computer-readable storage medium storing instructions that, when executed by a server, cause the server to perform a method for providing information of stored object, the method comprising:

generating a three-dimensional spatial model of a storage space, the three-dimensional spatial model comprising storage location information corresponding to at least one object stored inside the storage space; and providing the three-dimensional spatial model to a client terminal, causing the client terminal to:

determine a target object stored inside the storage space;

conduct spatial matching between the three-dimensional spatial model and the storage space through one or more sensors of an augmented reality (AR) device to determine a target storage location of the target stored object based on the three-dimensional spatial model;

obtain a navigation route based on location information of an augmented reality (AR) device and the target storage location;

render, on a screen display, navigation information indicating the navigation route over the storage space within a field of view of the AR device;

render, on the screen display, supplementary information including task list information over the storage space and in a side region of the storage space within the field of view of the AR device;

move the supplementary information outside of the field of view of the AR device when the AR device approaches the target stored object;

detect, using the one or more sensors of the AR device, whether a line of sight of a user of the AR device focuses on the side region of the storage space within the field of view of the AR device; and in response to detecting that the line of sight of the user of the AR device focuses on the side region of the storage space, move the supplementary information inside the field of view of the AR device.

23. The non-transitory computer-readable storage medium according to claim 22, wherein the method further comprises:

receiving a collection task request from the client terminal; and distributing a collection task including information of at least the target stored object to the client terminal, the collection task causing the client terminal to determine the target stored object based on the collection task.

24. The non-transitory computer-readable storage medium according to claim 23, wherein the method further comprises:

receiving a notification of successful retrieval of the target stored object from the client terminal; and updating inventory information of the target stored object based on the notification.

25. A method for collecting goods stored in a warehouse, implementable by a client terminal, the method comprising:

acquiring a three-dimensional spatial model of a target warehouse, the three-dimensional spatial model comprising storage location information corresponding to at least one merchandise stored in the target warehouse;

transmitting a collection task request to a server;

determining a target merchandise based on a collection task distributed by the server in response to the collection task request, and determining a target storage location of the target merchandise based on the three-dimensional spatial model;

obtaining navigation information based on location information of an augmented reality (AR) device and the target storage location; and rendering the navigation information through the AR device on a screen display, for collecting the target merchandise in accordance with the navigation information, wherein the navigation information indicates a navigation route over the target warehouse within a field of view of the AR device;

rendering, on the screen display, supplementary information including task list information over the target warehouse and in a side region of the target warehouse within the field of view of the AR device;

moving the supplementary information outside of the field of view of the AR device when the AR device approaches the target merchandise;

detecting, using the one or more sensors of the AR device, whether a line of sight of a user of the AR device focuses on the side region of the target warehouse within the field of view of the AR device; and in response to detecting that the line of sight of the user of the AR device focuses on the side region of the target warehouse, moving the supplementary information inside the field of view of the AR device.

26. An apparatus for collecting goods stored in a warehouse, the apparatus comprising:

a model acquisition unit configured to acquire a three-dimensional spatial model of a target warehouse, the three-dimensional spatial model comprising storage location information corresponding to at least one merchandise stored in the target warehouse;

a task request unit configured to transmit a collection task request to a server;

an information determination unit configured to determine a target merchandise based on a collection task distributed by the server in response to the collection task request, and determining a target storage location of the target merchandise based on the three-dimensional spatial model;

a navigation route calculation unit configured to obtain navigation information based on location information of an augmented reality (AR) device and the target storage location; and a navigation information supply unit configured to render the navigation information through the AR device on a screen display, for collecting the target merchandise in accordance with the navigation information, wherein the navigation information indicates a navigation route over the target warehouse within a field of view of the AR device; to render, on the screen display, supplementary information including task list information over the target warehouse and in a side region of the target warehouse within the field of view of the AR device; to move the supplementary information outside of the field of view of the AR device when the AR device approaches the target merchandise; to detect, using the one or more sensors of the AR device, whether a line of sight of a user of the AR device focuses on the side region of the target warehouse within the field of view of the AR device; and in response to detecting that the line of sight of the user of the AR device focuses on the side region of the target warehouse, to move the supplementary information inside the field of view of the AR device.

* * * * *